United States Patent Office 3,155,695
Patented Nov. 3, 1964

3,155,695
16-DIFLUOROMETHYL ADRENOCORTICOIDS
Albert Bowers and John Edwards, Mexico City, Mexico, assignors, by mesne assignments, to Syntex Corporation, a corporation of Panama
No Drawing. Filed Oct. 18, 1960, Ser. No. 63,267
Claims priority, application Mexico July 2, 1960
15 Claims. (Cl. 260—397.45)

The present invention relates to novel cyclopentanophenanthrene derivatives and to a novel process for the production thereof.

More particularly the present invention relates to novel 16α-trifluoromethyl, 16α-difluoromethyl and 16α-monofluoromethyl cortical hormones and more specifically to derivatives of Δ⁴-pregnene-3,20-diones which have a hydroxy or acyloxy group at C-21, a hydroxy group at C-17α, a keto or hydroxy group at C-11, halogen at C-6α and/or at C-9α, and may further have a methyl group at C-6α and unsaturation at C-1,2.

The novel compounds of the present invention which are potent cortical hormones exhibiting glycogenic, antiinflammatory, thymolytic, catabolic, anti-androgenic, anti-estrogenic and anti-gonadotrophic activities as well as suppress the pituitary, are represented by the following formulas:

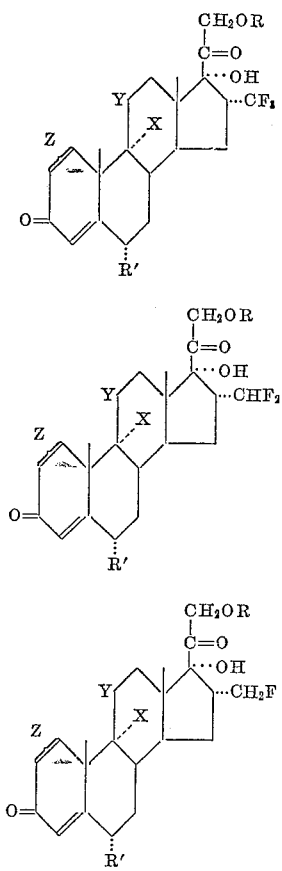

In the above formulas, Y represents β-hydroxy or keto; X represents hydrogen, chlorine or fluorine; Z represents a double bond or a saturated linkage between C-1 and C-2; R' represents hydrogen, methyl, fluorine or chlorine and R represents hydrogen or the acyl radical of a hydrocarbon carboxylic acid of less than 12 carbon atoms, which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

When in the above formulas, R' represents hydrogen, fluorine or chlorine, the compounds also possess antifungal and anti-bacterial properties.

The novel compound of the present invention possessing a trifluoromethyl group at C-16α may be prepared by a process illustrated by the following equation:

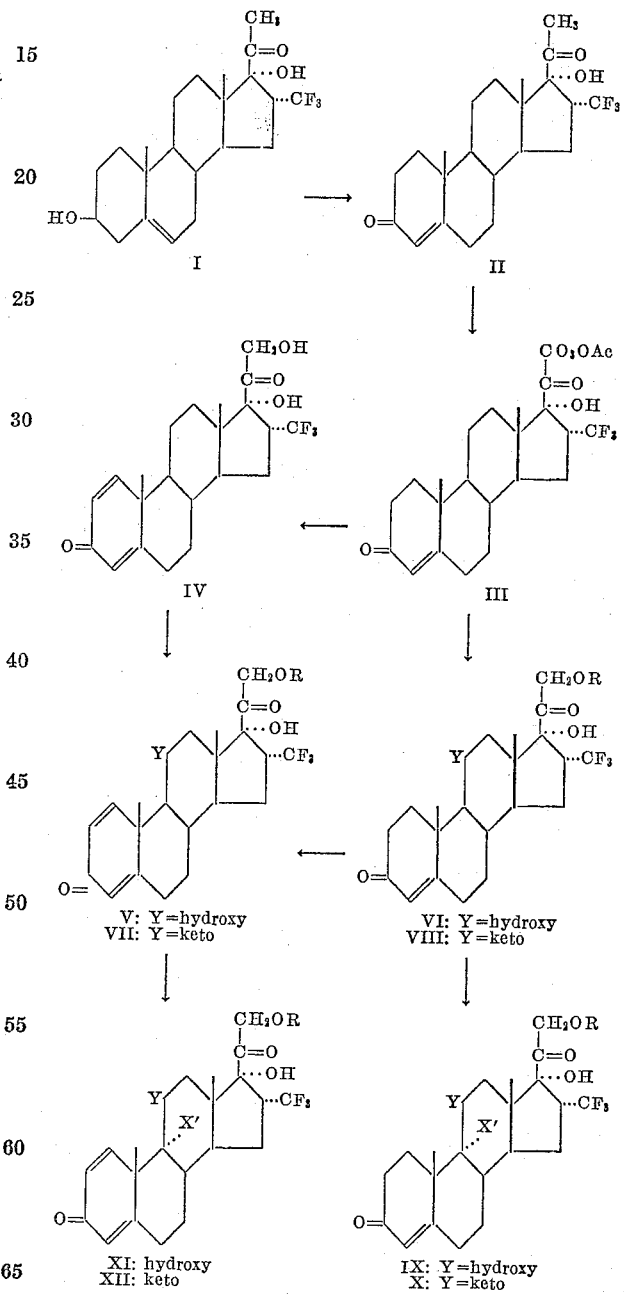

In the above equation X' represents chlorine or fluorine; Ac represents acetyl or another acyl group derived from hydrocarbon carboxylic acids of less than 12 carbon atoms of the type previously mentioned; Y and R have the same meaning as previously set forth.

In practicing the process outlined above, the starting material 16α-trifluoromethyl-Δ⁵-pregnene-3β,17α-diol-20-one is prepared as described in our copending application Serial No. 63,265, filed of even date, by treating 3β-acetoxy-Δ⁵,¹⁶-pregnadiene-20-one with a trifluoromethyl magnesium halide, introducing a hydroxyl group at C-17α by forming the enol acetate 16α-trifluoromethyl-Δ⁵,¹⁷⁽²⁰⁾-pregnadiene-3β,20-diol diacetate followed by peracid oxidation to form 16α-trifluoromethyl-5,6;17,20-bis-oxido-pregnan-3β,20-diol diacetate which upon treatment with methanolic potassium hydroxide is converted into 16α-trifluoromethyl-5α,6α-oxido-pregnane-3β,17α-diol-20-one. The 5(6) double bond is then regenerated by treating the latter compound with zinc and sodium iodide to thus form 16α-trifluoromethyl-Δ⁵-pregnene-3β,17α-diol-20-one (I).

Upon oxidation with 8 N-chromic acid in acetone solution followed by treatment of the resulting Δ⁵-3-ketone with oxalic acid, the latter compound is converted into 16α-trifluoromethyl-Δ⁴-pregnen-17α-ol-3,20-dione (II).

By monoiodination at C-21 of the 16α-trifluoromethyl-Δ⁴-pregnen-17α-ol-3,20-dione as by reaction with an excess of iodine in the presence of a base such as solid calcium oxide in mixture with tetrahydrofuran and methanol (as described by Stork et al. in U.S. Patent No. 2,874,154), followed by reflux of the thus formed 21-iodo compound with sodium acetate or potassium acetate in mixture with acetone, there is introduced an acetoxy group at C-21 to form 16α-trifluoromethyl-Δ⁴-pregnene-17α,21-diol-3,20-dione-21-acetate (III). Upon reflux of the latter compound with selenium dioxide in mixture with t-butanol in the presence of catalytic amounts of pyridine or with 2,3-dichloro-5,6-dicyano-1,4-benzoquinone, there is formed 16α-trifluoromethyl-Δ¹,⁴-pregnadiene-17α,21-diol-3,20-dione-21-acetate. The ester group is saponified as by treatment with methanolic potassium hydroxide under an atmosphere of nitrogen for 1 hour at 0° C. By subjecting the thus formed 16α-trifluoromethyl-Δ¹,⁴-pregnadiene-17α,21-diol-3,20-dione (IV) to microbiological oxidation as by incubation with adrenal glands or with the microorganism *Curvularia lunata* ATCC 13935, there is formed 16α-trifluoromethyl-prednisolone (V; R=hydrogen).

Alternatively 16α-trifluoromethyl-Δ⁴-pregnene-17α,21-diol-2,20-dione-21-acetate (III) is saponified with methanolic potassium hydroxide and the thus formed 16α-trifluoromethyl-Δ⁴-pregnene-17α,21-diol-3,20-dione is similarly subjected to incubation with adrenal glands or with *Curvularia lunata* ATCC 13935, to finally produce 16α-trifluoromethyl-hydrocortisone (VI; R=hydrogen) which can be further dehydrogenated at C-1, 2 by treatment with selenium dioxide as described above to afford 16α-trifluoromethyl-prednisolone (V; R=hydrogen).

Conventional esterification of 16α-trifluoromethyl-hydrocortisone and of 16α-trifluoromethyl-prednisolone with hydrocarbon carboxylic acid anhydrides or chlorides of less than 12 carbon atoms followed by oxidation of the thus formed C-21 esters affords the corresponding C-21-esters of 16α-trifluoromethyl-cortisone (VIII; R=acyl) and 16α-trifluoromethyl-prednisone (VII; R=acyl), which, upon hydrolysis are converted into the free alcohols, 16α-trifluoromethyl-cortisone (VIII; R=hydrogen), and 16α-trifluoromethyl-prednisone (VII; R=hydrogen).

For introduction of a halogen atom at C-9α,16α-trifluoromethyl-hydrocortisone acetate is first dehydrated to C-9,11 by reaction with mesyl chloride in dimethylformamide-pyridine solution to produce 16α-trifluoromethyl-Δ⁴,⁹⁽¹¹⁾-pregnadiene-17β,21-diol-3,20-dione-21-acetate. The latter compound is then subjected to the method described by Fried et al., J. Am. Chem. Soc., 79, 1130 (1957). This method entails treatment of the aforementioned compounds with a reagent capable of generating hypobromous acid such as a N-bromoimide or N-bromoamide or the hypobromite of an alkali or alkali-earth metal, preferably N-bromoacetamide and aqueous perchloric acid in dioxane to produce the bromohydrin. The latter is refluxed with potassium acetate in dioxane-methanol to form the 9β,11β-oxido compound. By reaction with hydrogen fluoride or hydrogen chloride in an inert solvent such as chloroform or a mixture of tetrahydrofurane and methylene chloride under anhydrous conditions and low temperature, there is obtained the corresponding fluorohydrin or chlorohydrin namely, 16α-trifluoromethyl-9α-fluoro-hydrocortisone acetate (IX; R=acetyl; X′=fluorine), and 16α-trifluoromethyl-9α-chloro-hydrocortisone acetate, (IX; R=acetyl; X′=chlorine), which upon oxidation with chromic acid is converted into the corresponding 16α-trifluoromethyl-9α-fluoro-cortisone (X; R=acetyl; X′=fluorine) and 16α-trifluoromethyl-9α-chloro-cortisone acetates (X; R=acetyl; X′=chlorine). Upon treatment of the aforementioned hydrocortisone and cortisone compounds with selenium dioxide in t-butanol and in the presence of catalytic amounts of pyridine or with 2,3-dichloro-5,6-dicyano-1,4-benzoquinone in dioxane, dehydrogenation at C-1,2 occurs and there is formed the acetates of 16α-trifluoromethyl-9α-fluoro-prednisolone (XI; R=acetyl; X′=fluoro), 16α-trifluoromethyl-9α-chloro-prednisolone (XI; R=acetyl; X′=chloro), 16α-trifluoromethyl-9α-fluoro-prednisone (XII; R=acetyl; X′=fluoro), and 16α-trifluoromethyl-9α-chloro-prednisone (XII; R=acetyl; X′=chloro).

The esters are converted into the corresponding free alcohols by treatment with dilute methanolic potassium hydroxide. By conventional esterification with hydrocarbon carboxylic acids anhydrides of the type mentioned previously, other C-21-esters are prepared.

By substituting in the process outlined above the 16α-trifluoromethyl-Δ⁵-pregnene-3β,17α-diol-20-one by 16α-monofluoromethyl-Δ⁵-pregnene-3β,17α-diol-20-one prepared in the same manner from 3β-acetoxy-Δ⁵,¹⁶-pregnadiene-20-one except that the trifluoromethyl magnesium halide is substituted by monofluoromethyl magnesium halide as is more fully described in our copending application Serial No. 63,265, filed of even date, there is produced all of the above compounds having a monofluoromethyl group at C-16α in place of the trifluoromethyl group. Thus there is produced the novel cortical hormone compounds of the present invention:

16α-monofluoromethyl-hydrocortisone,
16α-monofluoromethyl-cortisone,
16α-monofluoromethyl-prednisolone,
16α-monofluoromethyl-prednisone,
9α-chloro-16α-monofluoromethyl-hydrocortisone,
9α-fluoro-16α-monofluoromethyl-hydrocortisone,
9α-chloro-16α-monofluoromethyl-cortisone,
9α-fluoro-16α-monofluoromethyl-cortisone,
9α-chloro-16α-monofluoromethyl-prednisolone,
9α-fluoro-16α-monofluoromethyl-prednisolone,
9α-chloro-16α-monofluoromethyl-prednisone and
9α-fluoro-16α-monofluoromethyl-prednisone.

By applying the process outlined above to 6-methyl-16α-trifluoromethyl-Δ⁵-pregnene-3β,17α-diol-20-one and the corresponding 16α-monofluoromethyl derivatives prepared as disclosed in our copending application Serial No. 63,265, filed of even date, from 6-methyl-Δ⁵,¹⁶-pregnadien-3β-ol-20-one acetate (described by Petrow et al., J. Chem. Soc., 4,096, 1957) instead of the 16α-trifluoromethyl-Δ⁵-pregnene-3β,17α-diol-20-one, there are prepared the corresponding compounds having a methyl group at C-6. Thus there is obtained in a consecutive manner, the following compounds, a mixture of C-20 epimers of a magnesium halide enolate of 6-methyl-16α-trifluoromethyl-Δ⁵-pregnen-3β-ol-20-one;
6-methyl-16α-trifluoromethyl-Δ⁵-pregnen-3β-ol-20-one;
the diacetate of 6-methyl-16α-trifluoromethyl-Δ⁵,¹⁷⁽²⁰⁾-pregnadiene-3β,20-diol;
the diacetate of 6-methyl-16α-trifluoromethyl-5,6;17,20-dioxido-pregnane-3β,20-diol;

6-methyl-16α-trifluoromethyl-5,6-oxido-pregnane-3β,17α-diol-20-one;
6-methyl-16α-trifluoromethyl-Δ⁵-pregnene-3β,17α-diol-20-one;
6α-methyl-16α-trifluoromethyl-17α-hydroxy-Δ⁴-pregnene-3,20-dione;
6α-methyl-16α-trifluoromethyl-21-acetoxy-Δ⁴-pregnen-17α-ol-3,20-dione and
6α-methyl-16α-trifluoromethyl-Δ¹,⁴-pregnadiene-17α,21-diol-3,20-dione,
6α-methyl-16α-trifluoromethyl-hydrocortisone,
6α-methyl-16α-trifluoromethyl-cortisone,
6α-methyl-16α-trifluoromethyl-prednisolone,
6α-methyl-16α-trifluoromethyl-prednisone,
6α-methyl-9α-chloro-16α-trifluoromethyl-hydrocortisone,
6α-methyl-9α-fluoro-16α-trifluoromethyl-hydrocortisone,
6α-methyl-9α-chloro-16α-trifluoromethyl-cortisone,
6α-methyl-9α-fluoro-16α-trifluoromethyl-cortisone,
6α-methyl-9α-chloro-16α-trifluoromethyl-prednisolone,
6α-methyl-9α-fluoro-16α-trifluoromethyl-prednisolone,
6α-methyl-9α-chloro-16α-trifluoromethyl-prednisone,
6α-methyl-9α-fluoro-16α-trifluoromethyl-prednisone
and the corresponding 16α-monofluoromethyl derivatives of the above compounds.

Alternatively the above novel compounds of the present invention having a trifluoromethyl group at C-16α and a methyl group at C-6α may be prepared by a process illustrated by the following equation:

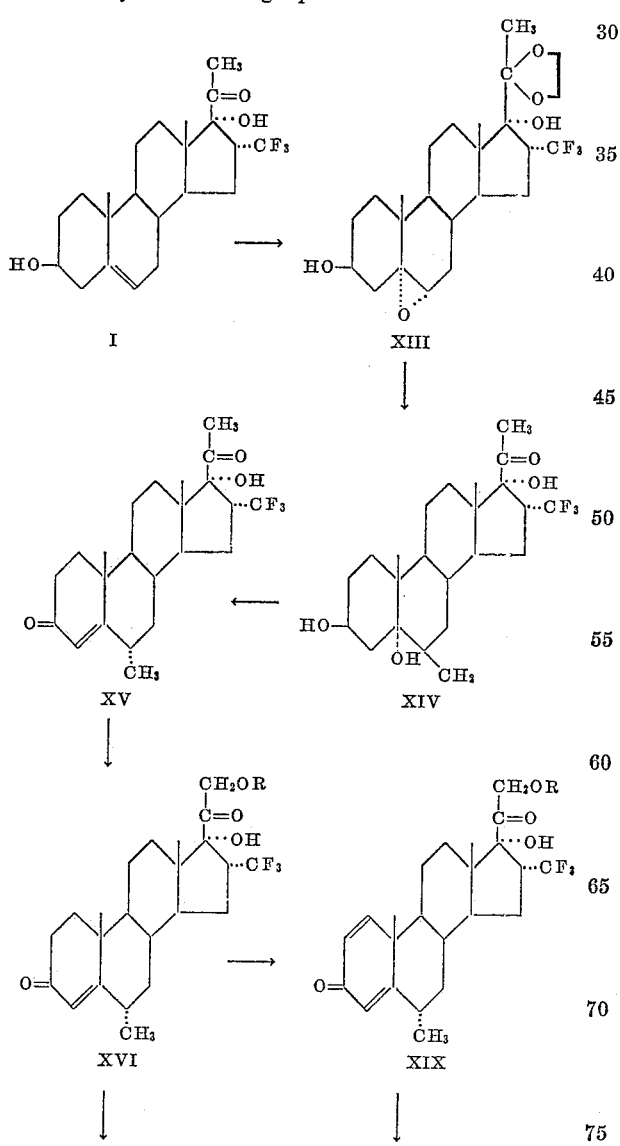

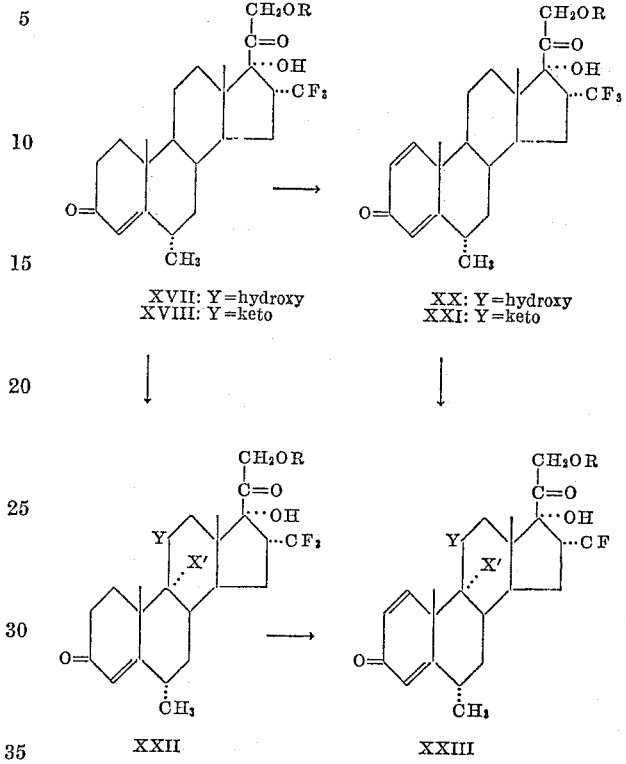

In the above equation, R and X' have the same meaning as set forth previously.

In practicing the process outlined above the keto group of 16α-trifluoromethyl-Δ⁵-pregnene-3β,17α-diol-20-one (I) is protected by formation of the cyclic ketal by conventional reaction with a glycol such as ethylene glycol, followed by oxidation of the 5(6) double bond with a peracid such as monoperphthalic or perbenzoic acid to form 16α - trifluoromethyl-5α,6α-oxido-20-ethylenedioxy-pregnane-3β,17α-diol (XIII). Treatment of the 5α,6α-oxido compound with methyl magnesium halide, preferably methyl magnesium bromide, followed by ammonium chloride decomposition of the Grignard reagent results in the formation of the 6β-methyl-5α-hydroxy compound, and by further treatment with an acid such as p-toluenesulfonic acid in acetone at reflux temperature, hydrolysis of the cyclic ketal group is effected to thus form 16α-trifluoromethyl-6β-methyl-pregnane-3β,5α,17α - triol - 20-one (XIV). Upon oxidation of the latter compound with chromium trioxide in acetone, the 3β-hydroxy group is converted into the 3-keto group to produce 16α-trifluoromethyl-6α-methyl-pregnane-5α,17α-diol-3,20-dione which upon reaction with methanolic potassium hydroxide results in dehydration at C-5 with introduction of the double bond at C-4(5) and concomitant inversion of the 6β-methyl group to produce 16α-trifluoromethyl-6α-methyl-Δ⁴-pregnen-17α-ol-3,20-dione (XV) (16α-trifluoromethyl-6α-methyl-17α-hydroxy-progesterone). The latter compound is then converted, stepwise, into the C-21-iodo, C-21-acetoxy (XVI: R=acetyl) and C-21-hydroxy compound (XVI: R=hydrogen) in the same manner as described for the C-6 unsubstituted compound. By subjecting the thus formed 16α-trifluoromethyl-6α-methyl-Δ⁴-pregnene-17α,21-diol-3,20-dione (XVI: R=hydrogen) to microbiological oxidation as described previously, there is formed 16α-trifluoromethyl-6α-methylhydrocortisone (XVII: R=hydrogen) which upon conventional esterification is converted into the C-21-ester derivatives (XVII: R=acyl). Oxidation of the latter compounds give the 16α-trifluoromethyl-6α-methyl-cortisone (XVIII: R=hydrogen) and the C-21-ester (XVIII: R=acyl). A double bond can then be introduced at C-1,2 in the above compounds as by treatment with selenium dioxide or 2,3-dichloro-5,6-dicyano-1,4-benzoquinone as set forth previously to form the corresponding prednisolone and prednisone derivatives and the esters thereof with hydrocarbon carboxylic acid esters of the type hereinabove set forth (XX) and (XXI).

For introduction of a halogen atom at C-9α,16α-trifluoromethyl-6α-methyl-hydrocortisone acetate (XVII: R=acetyl) is first dehydrated at C-9(11) and then by following the method of Fried et al. as described previously there is formed the 9α-fluoro and 9α-chloro derivatives of 16α-trifluoromethyl-6α-methyl-hydrocortisone and of 16α-trifluoromethyl-6α-methyl-cortisone acetates (XXII). By dehydrogenation at C-1,2 by the method described for the C-6 unsubstituted compounds there is formed the C-21 acetates of 6α-methyl-16α-trifluoromethyl-9α-fluoro-prednisolone, 6α-methyl-16α-trifluoromethyl-9α-chloro-prednisolone, 6α-methyl-16α-trifluoromethyl-9α-fluoro-prednisone and 6α-methyl-16α-trifluoromethyl-9α-chloro-prednisone (XXIII). Alkaline hydrolysis of all of the above esters give the corresponding C-21 alcohols which can then be esterified with other hydrocarbon carboxylic acid anhydrides or chlorides of less than 12 carbon atoms by conventional methods to give the corresponding C-21 esters. The dehydrogenation at C-1,2 may be effected prior to the introduction of the hydroxyl group at C-11 by microbiological oxidation thus producing 6α-methyl-16α-trifluoromethyl-Δ$^{1,4}$-pregnadiene-17α,21-diol-3,20-dione (XIX: R=hydrogen) from 6α-methyl-16α-trifluoromethyl-Δ$^4$-pregnene-17α,21-diol-3,20-dione (XVI: R=hydrogen). Upon microbiological oxidation in the manner described above, the 1-dehydro compound (XIX: R=hydrogen) is converted into 6α-methyl-16α-trifluoromethyl prednisolone (XX: R=hydrogen) which upon further oxidation with chromic acid is transformed into 6α-methyl-16α-trifluoromethyl-prednisone (XXI: R=hydrogen). A halogen atom may then be introduced at C-9α in the manner described above to afford 9α-chloro and 9α-fluoro derivatives of 6α-methyl-16α-trifluoromethyl-prednisolone and of 6α-methyl-16α-trifluoromethyl prednisone (XXIII) and the esters thereof.

In a similar manner by following the process outlined above, there are prepared the corresponding 6α-methyl-16α-monofluoromethyl derivatives by substituting the starting material 16α-trifluoromethyl-Δ$^5$-pregnene-3β,17α-diol-20-one by 16α-monofluoromethyl-Δ$^5$-pregnene-3β,17α-diol-20-one.

The novel compounds of the present invention having a trifluoromethyl group at C-16α and a fluoro group at C-6α may be prepared by a process illustrated by the following equation:

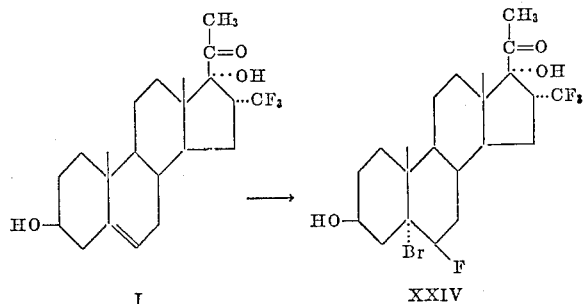

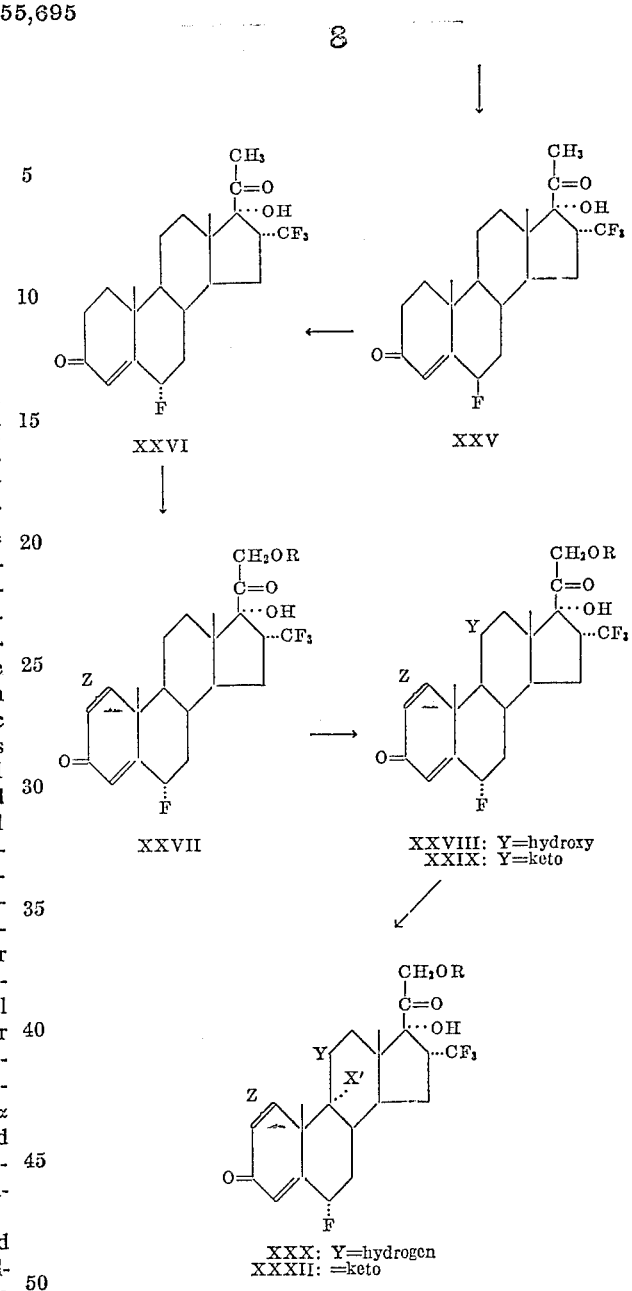

In the above formulas, X′, Y, Z and R have the same meaning as previously set forth.

In practicing the process outlined above, N-bromoacetamide is added together with a solution of 16α-trifluoromethyl-Δ$^5$-pregnene-3β,17α-diol-20-one (I) to a large excess of anhydrous hydrogen fluoride mixed with tetrahydrofurane at −70°. The reaction mixture is maintained at −70° C. for 4 hours to form 16α-trifluoromethyl-5α-bromo-6β-fluoro-pregnane-3β,17α-diol-20-one (XXIV). Upon oxidation with 8 N chromic acid, the 3β-hydroxy group is converted to the 3-keto group and by subsequent reaction with sodium acetate and methanol, dehydrobromination at C-5 is effected to form 6β-fluoro-16α-trifluoromethyl-Δ$^4$-pregnen-17α-ol-3,20-dione (XXV). Upon reaction of the latter compound with a mineral acid, inversion of the steric configuration at C-6 is effected and there is formed 6α-fluoro-16α-trifluoromethyl-Δ$^4$-pregnen-17α-ol-3,20-dione (XXVI). A hydroxy group is then introduced at C-21 by the method of Stork et al. and Ringold et al., supra, to afford 6α-fluoro-16α-trifluoromethyl-Δ$^4$-pregnene-17α,21-diol-3,20-dione (XXVII: Z=saturated linkage; R=hydrogen) and the 21-acetate thereof (XXVII: Z=saturated linkage; R=acetyl).

By subjecting the thus formed 6α-fluoro-16α-trifluoromethyl-Δ⁴-pregnene - 17α,21 - diol - 3,20 - dione (XXVII: Z=saturated linkage; R=hydrogen) to microbiological oxidation as set forth above for the C-6 unsubstituted compound, followed by conventional esterification with acetic anhydride, there is formed 16α-trifluoromethyl-6α-fluoro-hydrocortisone (XXVIII: Z=saturated linkage; R=hydrogen) and its 21-acetate (XXVIII: Z=saturated linkage; R=acetyl), respectively, which can be oxidized with chromic acid to form 16α-trifluoromethyl-6α-fluoro-cortisone (XXIX: Z=saturated linkage; R=hydrogen) and its 21-acetate (XXIX: Z=saturated linkage; R=acetyl).

In the same manner as set forth previously, the 16α-trifluoromethyl-6α-fluoro-hydrocortisone or its 21-acetate is dehydrogenated at C-1, 2 to form 16α-trifluoromethyl-6α-fluoro-prednisolone (XXVIII: Z=double bond; R=hydrogen) which, by oxidation is converted into 16α-trifluoromethyl-6α-fluoro-prednisone (XXIX: Z=double bond; R=hydrogen) and the corresponding 21-acetates thereof.

By subjecting 16α-trifluoromethyl-6α-fluoro - hydrocortisone-21-acetate to dehydration and then following the method of Fried et al., supra, there is formed the 9α-fluoro and 9α-chloro derivatives of 16α-trifluoromethyl-6α-fluoro-hydrocortisone acetate (XXX: Z=saturated linkage; R=acetyl) and of 16α-trifluoromethyl-6α-fluoro-cortisone acetate (XXXI: Z=saturated linkage; R=acetyl). By subsequent treatment with selenium dioxide there is formed the C-21-acetates of 16α-trifluoromethyl-6α,9α-difluoro-prednisolone, (XXX: Z=double bond, R=acetyl); 16α-trifluoromethyl - 6α - fluoro - 9α - chloro-prednisolone (XXX: Z=double bond, R=acetyl), 16α-trifluoromethyl-6α,9α - difluoro - prednisone (XXXI: Z=double bond; R=acetyl), and 16α-trifluoromethyl-6α-fluoro-9α-chloro-prednisone (XXXI: Z=double bond; R=acetyl). Alkaline hydrolysis of all of the above esters give the corresponding C-21 alcohols which can be acylated by conventional methods with other hydrocarbon carboxylic acid anhydrides or chlorides of less than 12 carbon atoms to obtain the corresponding C-21 esters.

The novel compounds of the present invention having a monofluoromethyl group at C-16α and a fluoro group at C-6α may be prepared in the same manner described above for the 16α-trifluoromethyl series by starting with 16α - monofluoromethyl-Δ⁵-pregnene-3β,17α-diol-20-one instead of the corresponding 16α-trifluoromethyl compound.

Alternatively the fluoro group may be introduced at C-6 by treating 16α-monofluoromethyl or 16α-trifluoromethyl-Δ⁵-pregnene-3β,17-diol-20-one with a peracid such as monoperphthalic or perbenzoic acid to oxidize the 5,6 double bond to thus form the 5α,6α-oxido derivative. Upon reaction of the latter compound with fluoroboric acid, in accordance with the method described in copending application Serial No. 26,703, filed on May 4, 1960, the oxido ring is opened and there is formed the 16α-monofluoromethyl- or 16α-trifluoromethyl-6β-fluoro-pregnane-3β,5α,17α-triol-20-one. The 3-hydroxy group is converted into the 3-keto group upon oxidation with chromic acid and upon further reaction with concentrated hydrochloric acid, dehydration is effected at C-5 with simultaneous inversion of the steric configuration at C-6 to form 16α-monofluoromethyl- or 16α-trifluoromethyl-6α-fluoro-Δ⁴-pregnen-17α-ol-3,20-dione. The C-21 hydroxy group may then be introduced by subsequent microbiologiacl oxidation and dehydrogenation at C-1,2 as described above, the novel cortical compounds of the present invention having a 6α-fluoro and a 16α-monofluoromethyl or 16α-trifluoromethyl group are produced.

The novel compounds of the present invention having a trifluoromethyl group at C-16α and a chloro group at C-6α may be prepared by a process illustrated by the following equation:

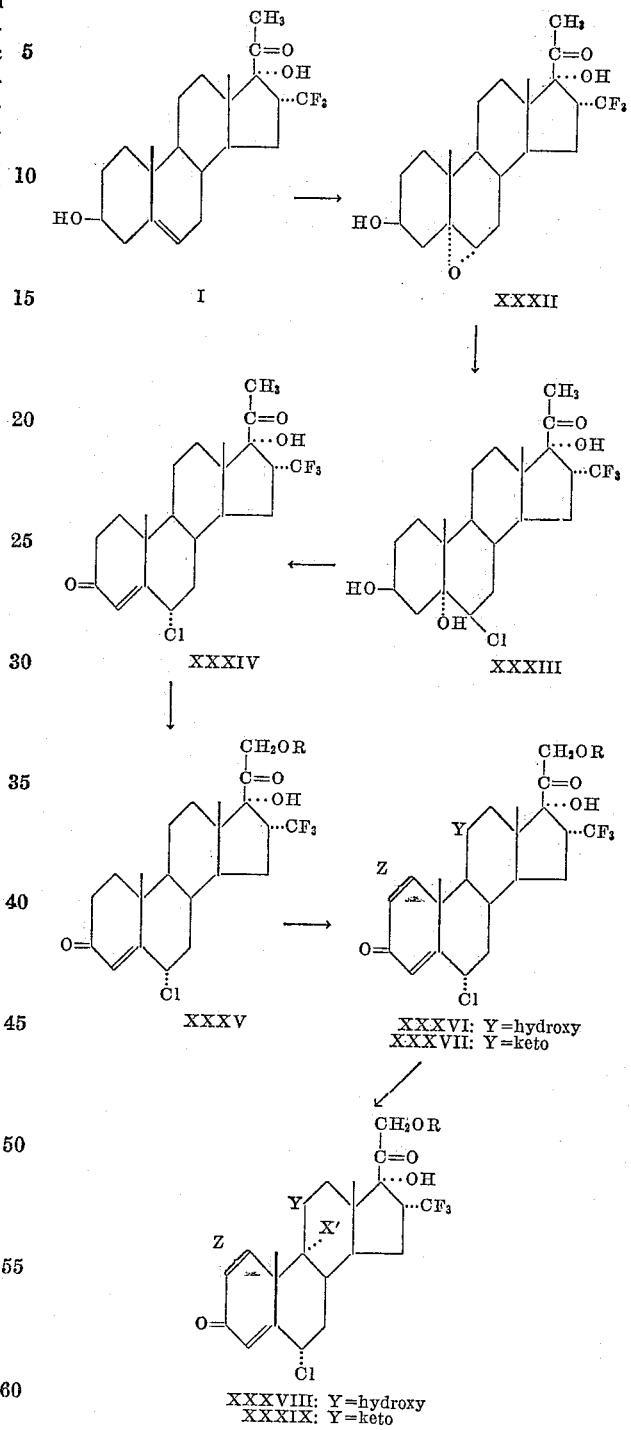

In the above formulas, R, X', Y and Z have the same meaning as previously defined.

In practicing the process outlined above, 16α-trifluoromethyl-Δ⁵-pregnene-3β,17α-diol-20-one (I) is reacted with a peracid such as monoperphthalic acid or perbenzoic acid to oxidize the 5(6) double bond to form the corresponding 5α,6α-oxido compound (XXXII). Upon treatment of the latter compound with concentrated hydrochloric acid in glacial acetic acid, there is formed 16α - trifluoromethyl-6β-chloro-pregnane-3β,5α,17α-triol-20-one (XXXIII) which upon oxidation with chromic acid is converted into 16α-trifluoromethyl-6β-chloro-5α,17α-diol-3,20-dione. Treatment of the latter compound in glacial acetic acid with dry hydrochloric acid results in the inversion of the steric configuration at C-6 and there is afforded 16α-trifluoromethyl-6α-chloro-Δ⁴-pregnene-17α-ol-3,20-dione (XXXIV). By following the methods described previously there is introduced a hydroxy group at C-21, a hydroxy or keto group at C-11, a chloro or fluoro group at C-9α to thus form 16α - trifluoromethyl - 6α-chloro-Δ⁴-pregnene-17α,21-diol-3,20-dione (XXXV), 16α-triflurioromethyl-6α-chloro-hydrocortisone (XXXVI: Z=saturated linkage; R=hydrogen); 16α-trifluoromethyl-6α-chloro-cortisone (XXXVII: Z=saturated linkage; R=hydrogen), 16α-trifluoromethyl-6α-chloro-9α-fluoro-hydrocortisone (XXXVIII: Z=saturated linkage; R=hydrogen), 16α-trifluoromethyl-6α-chloro-9α-fluoro-cortisone (XXXIX: Z=saturated linkage; R=hydrogen); 16α-trifluoromethyl-6α,9α-dichloro-hydrocortisone (XXXVIII: Z=saturated linkage; R=hydrogen), 16α-trifluoromethyl-6α,9α-dichloro-cortisone (XXXIX: Z=saturated linkage; R=hydrogen) and the corresponding 1-dehydro derivatives and C-21 esters with hydrocarbon carboxylic acid esters as described heretofore.

By substituting in the process just outlined the 16α-trifluoromethyl-Δ⁵-pregnene-3β,17α-diol-20-one by 16α-monofluoromethyl-Δ⁵-pregnene-3β,17α-diol-20-one, there is produced all of the above 6-chloro compounds having a monofluoromethyl group at C-16α instead of a trifluoromethyl group.

Alternatively the 6α-chloro group may be introduced by treating 16α-trifluoromethyl-Δ⁴-pregnen-17α-ol-3,20-dione (II) or the corresponding 16α-monofluoromethyl derivative with ethyl orthoformate to form the enol ether, 16α-trifluoromethyl or 16α-monofluoromethyl-3-ethoxy-Δ³,⁵-pregnadiene-17α-ol-20-one. Upon reaction of the latter in acetone and sodium acetate with N-chlorosuccinimide and acetic acid, there is obtained 16α-trifluoromethyl or 16α-monofluoromethyl-6β-chloro-Δ⁴-pregnen-17α-ol-3,20-dione, which upon further reaction with concentrated hydrochloric acid and acetic acid results in inversion of the steric configuration at C-6 to form 16α-trifluoromethyl or 16α-monofluoromethyl-6α-chloro-Δ⁴-pregnen-17α-ol-3,20-dione which can then be converted to the hydrocortisone and cortisone derivatives in the manner set forth above.

The novel compounds of the present invention possessing a difluoromethyl group at C-16α are prepared by a process illustrated by the following equation:

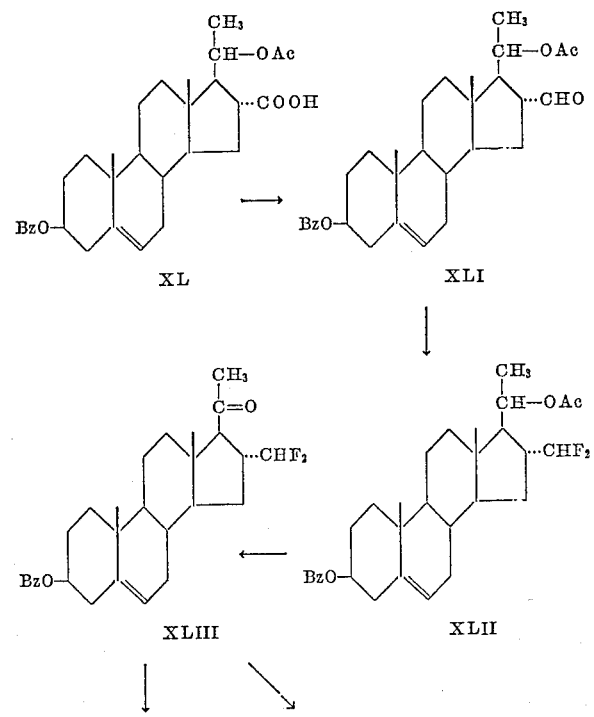

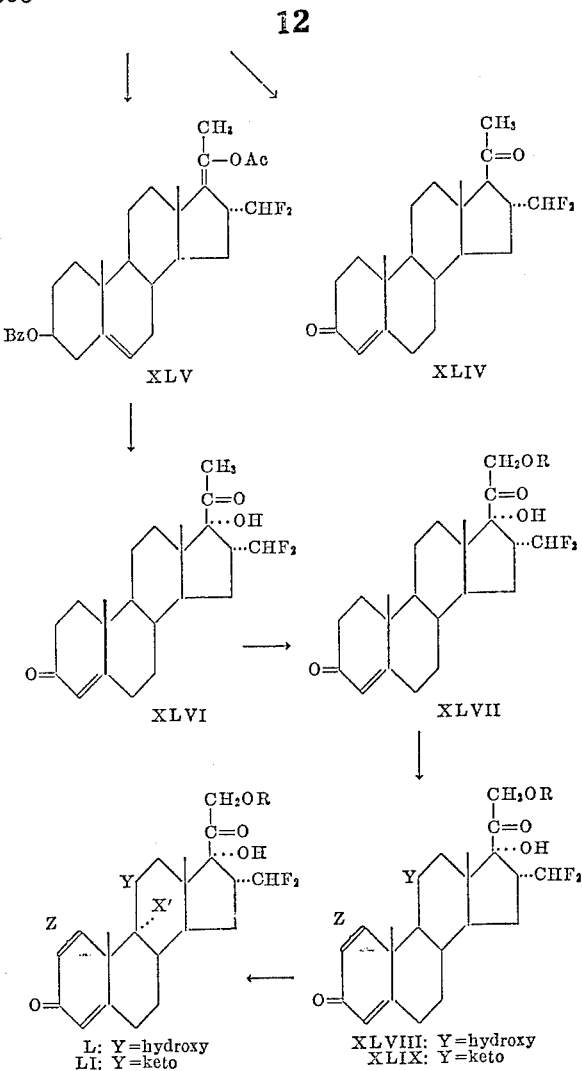

L: Y=hydroxy
LI: Y=keto

XLVIII: Y=hydroxy
XLIX: Y=keto

In the above formulas, Ac, R, Z and X' have the same meaning as previously set forth.

To practice the process outlined above, the starting material, the 3-benzoate-20-acetate of Δ⁵-pregnene-3β,20β-diol-16α-carboxylic acid (XL) is prepared by treating 16α-cyano-Δ⁵-pregnen-3β-ol-20-one acetate, described by J. Romo, Tetrahedron 3, 37 (1958), with sodium borohydride to reduce the C-20-keto group to the C-20 hydroxyl group which is then etherified by reaction with dihydropyran in benzene solution and in the presence of p-toluenesulfonic acid. The thus formed 20β-tetrahydropyranyloxy-16α-cyano-Δ⁵-pregnen-3β-ol-acetate is hydrolyzed by refluxing with methanolic potassium hydroxide, followed by benzoylation by conventional reaction with benzoyl chloride to afford the 3-benzoyloxy-20β-tetrahydropyranyloxy-Δ⁵-pregnene-16α-carboxylic acid. Hydrolysis of the tetrahydropyranyl ether moiety as by reaction of the latter compound in acetic acid with dilute hydrochloric acid followed by acetylation of the thus formed C-20β alcohol by conventional means affords the starting material, the 3-benzoate-20-acetate of Δ⁵-pregnene-3β,20β-diol-16α-carboxylic acid (XL). Treatment of the latter compound with oxalyl chloride followed by reduction of the thus formed acid chloride of XL by the reaction with lithium aluminum t-butoxide or by the method of Rosenmund results in the formation of the 3-benzoate-20-acetate of Δ⁵-pregnene - 3β,20β - diol - 16α - carboxaldehyde (XLI). The latter compound is then reacted with a large excess of sulfur tetrafluoride in benzene solution for a period of time in the order of 48 hours to effect replacement of the 16α-carboxaldehyde group by the difluoromethyl group and thus form 16α-difluoromethyl-Δ⁵-pregnene-3β,20β-diol-3-benzoate-20-acetate (XLII). The acetate group is saponified as by treatment with methanolic potassium carbonate, followed by oxidation of the thus formed C-20 alcohol with 8 N chromic acid to produce 16α-difluoromethyl-Δ$^5$-pregnen-3β-ol-20-one-benzoate (XLIII), which upon saponification with methanolic potassium carbonate is converted into 16α-difluoromethyl-Δ$^5$-pregnen-3β-ol-20-one. The latter compound is subjected to oxidation under Oppenauer conditions to form 16α-difluoromethyl progesterone (XLIV). For introduction of a hydroxyl group at C-17α, the intermediate 16α-difluoromethyl-Δ$^5$-pregnen-3β-ol-20-one benzoate (XLIII) is treated in the same manner as the corresponding 16α-trifluoromethyl compound. Thus reaction of the intermediate (XLIII) with a mixture of acetic acid and acetyl chloride or with acetic anhydride in the presence of p-toluenesulfonic acid results in the formation of the enol acetate, 16α-difluoromethyl-Δ$^{5,17(20)}$-pregnene-3β,20β-diol-3-benzoate-20-acetate (XLV). Upon subsequent reaction with a peracid such as peracetic acid, the corresponding 16α-difluoromethyl-5,6,17,20-dioxido-pregnane-3β,20-diol-3-benzoate-20-acetate is formed which upon treatment with a base such as dilute methanolic potassium hydroxide under an atmosphere of nitrogen is converted into 16α-difluoromethyl-5α,6α-oxido-pregnane-3β,17α-diol-20-one. The latter is then reacted with zinc and sodium iodide in acetic acid to regenerate the 5(6) double bond and the thus formed 16α-difluoromethyl-Δ$^5$-pregnene-3β,17α-diol-20-one is subjected to oxidation with 8N chromic acid followed by treatment with dry hydrogen chloride in glacial acetic acid or oxalic acid in methanol solution to form 16α-difluoromethyl-Δ$^4$-pregnen-17α-ol-3,20-dione (16α-difluoromethyl-17α-hydroxy-progesterone, XLVI). By monoiodination at C-21 of the 16α-difluoromethyl-Δ$^4$-pregnen-17α-ol-3,20-dione as by treatment with an excess of iodine in the presence of calcium oxide as described previously, followed by reaction with potassium acetate in mixture with acetone, there is formed 16α-difluoromethyl-Δ$^4$-pregnene-17α,21-diol-3,20-dione-21-acetate (XLVII; R=acetyl) which upon saponification with methanolic potassium hydroxide is converted into the free diol (XLVII: R=hydrogen).

In the same manner as set forth previously for the 16α-trifluoromethyl compounds, the 16α-difluoromethyl-Δ$^4$-pregnene-17α,21-diol-3,20-dione is subjected to microbiological oxidation to form 16α-difluoromethyl-hydrocortisone (XLVIII: Z=saturated linkage, R=hydrogen) which upon conventional esterification is converted into C-21 esters of hydrocarbon carboxylic acids of less than 12 carbon atoms (XLVIII: Z=saturated linkage; R=acyl). Oxidation of the latter compound with 8N chromic acid affords the corresponding C-21 esters of 16α-difluoromethyl-cortisone (XLIX: Z=saturated linkage; R=acyl) which upon hydrolysis are converted into the free compound, 16α-difluoromethyl-cortisone (XLIX; Z=saturated linkage; R=hydrogen).

By reacting 16α-difluoromethyl hydrocortisone acetate (XLVIII: Z=saturated linkage; R=acetyl) with 2,3-difluoro-5,6-dicyano-1,4-benzoquinone dehydrogenation is effected at C-1, 2 and there is formed 16α-difluoromethyl-prednisolone (XLVIII: Z=double bond; R=hydrogen) which upon oxidation is converted into 16α-difluoromethyl-prednisone (XLIX: Z=double bond; R=hydrogen).

For introduction of a halogen atom at C-9α,16α-difluoromethylhydrocortisone acetate (XLVIII: Z=saturated linkage; R=acetyl) is dehydrated at C-9(11) and by employing the method of Fried et al., supra, there is finally formed the 9α-fluoro and 9α-chloro derivatives of 16α-difluoromethyl-hydrocortisone acetate (L: Z=saturated linkage; R=acetyl) and of 16α-difluoromethyl-cortisone acetate (LI: Z=saturated linkage; R=acetyl). The reaction of the latter compounds with 2,3-dichloro-5,6-dicyano-1,4-benzoquinone effects dehydrogenation at C-1, 2 to produce the 9α-fluoro and 9α-chloro derivatives of 16α-difluoromethyl-prednisolone acetate (X: Z=double bond; R=acetyl) and of 16α-difluoromethyl-prednisone acetate (LI: Z=double bond; R=acetyl). Alkaline hydrolysis of the above esters produces the free compounds which can be reesterified at C-21 with other hydrocarbon carboxylic acid anhydrides or chlorides by conventional methods.

For preparation of the novel compounds of the present invention having a difluoromethyl group at C-16α and a fluoro group at C-6α,16α-difluoromethyl-Δ$^5$-pregnene-3β,17α-diol-20-one is subjected to the same reactions as set forth for the corresponding 16α-trifluoromethyl-Δ$^5$-pregnene-3β,17α-diol-20-one compound. Thus there is first formed the 5α-bromo-6β-fluoro compound and by the steps described previously there is formed 16α-difluoromethyl-6α-fluoro-Δ$^4$-pregnene-17α-21-diol-3,20-dione-21-acetate, 16α-difluoromethyl-6α-fluoro-Δ$^4$-pregnene-17α,21-diol-3,20-dione, 16α-difluoromethyl-6α-fluoro-hydrocortisone and the C-21-esters, 16α-difluoromethyl-6α-fluorocortisone and the C-21-esters thereof, as well as the free compounds and C-21 esters of 16α-difluoromethyl-6α-fluoro-prednisolone, 16α-difluoromethyl-6α-fluoro-prednisone, 16α-difluoromethyl-6α,9α-difluoro-hydrocortisone, 16α-difluoromethyl-6α,9α-difluoroprednisolone; 16α-difluoromethyl-6α,9α-difluoro-cortisone, 16α-difluoromethyl-6α,9α-difluoro-prednisone, 16α-difluoromethyl-6α-fluoro-9α-chloro-hydrocortisone, 16α-difluoromethyl-6α-fluoro-9α-chloroprednisolone, 16α-difluoromethyl-6α-fluoro-9α-chlorocortisone and 16α-difluoromethyl-6α-fluoro-9α-chloroprednisone.

The novel compounds of the present invention having a difluoromethyl group at C-16 and a methyl or chloro group at C-6α are prepared in the same manner as the corresponding 16α-trifluoromethyl-compounds except that 16α-difluoromethyl-Δ$^5$-pregnene-3β,17α-diol-20-one is employed as the starting material and there is thus formed the 16α-difluoromethyl-6α-methyl or 6α-chloro-Δ$^4$-pregnen-17α-ol-3,20-dione, which is successively converted into 16α-difluoromethyl-6α-methyl or 6α-chloro-Δ$^4$-pregnene-17α,21-diol-3,20-dione-21-acetate, 16α-difluoromethyl-6α-methyl or 6α-chloro-Δ$^4$-pregnene-17α,21-diol-3,20-dione, 16α-difluoromethyl-6α-methyl or 6α-chloro-hydrocortisone, and the C-21-esters thereof, 16α-difluoromethyl-6α-methyl or 6α-chloro-cortisone, the C-21-esters thereof, 16α-difluoromethyl-6α-methyl or 6α-chloro-prednisolone, the C-21-esters thereof, 16α-difluoromethyl-6α-methyl or 6α-chloro-prednisone, the C-21-esters thereof, as well as the 9α-fluoro and 9α-chloro derivatives of the preceding 16α-difluoromethyl-6α-methyl or 6α-chloro-hydrocortisone, cortisone, prednisolone and prednisone compounds.

The following specific examples serve to illustrate but are not intended to limit the scope of the present invention:

Example I 5 g. of 16α-trifluoromethyl-Δ$^5$-pregnene-3β,17α-diol-20-one described in our copending application Serial No. 63,265, filed of even date, were dissolved in 50 cc. of acetone, cooled to 0° C., flushed with nitrogen and treated under stirring with 8 N chromic acid solution, added in a thin stream, at 0° C., until the red color of chromium trioxide persisted in the mixture (the 8 N solution of chromic acid was prepared by dissolving 26.7 g. of chromium trioxide in 23 cc. of concentrated sulfuric acid and diluting with water to 100 cc.). After diluting the mixture with water the product was collected by filtration, washed with water and dried under vacuum.

The crude product was dissolved in 200 cc. of methanol and treated at room temperature with a solution of 0.5 g. of oxalic acid in 5 cc. of water. The mixture was kept standing for 3 hours, then treated with water and the product was collected by filtration, washed with water to neutral and dried. There was thus obtained 16α-trifluoromethyl-17α-hydroxy-Δ$^4$-pregnene3,20-dione.

To a solution of 3.9 g. of 16α-trifluoromethyl-17α-hydroxy-Δ$^4$-pregnene-3,20-dione in 30 cc. of tetrahydrofurane and 18 cc. of methanol was added under vigorous stirring 6 g. of calcium oxide and then 6 g. of iodine; the stirring was continued at room temperature until the color of the solution became pale yellow and then the mixture was poured into ice water containing 15 cc. of acetic acid and 2.1 g. of sodium thiosulfate, the mixture was stirred for 15 minutes, most of the liquid was separated by decantation and the precipitate was collected, washed with water and dried under vacuum. There was thus obtained 16α-trifluoromethyl-17α-hydroxy-21-iodo-Δ$^4$-pregnene-3,20-dione.

The above substance was mixed with 105 g. of anhydrous acetone and 12 g. of recently fused potassium acetate and refluxed for 8 hours, concentrated to a small volume under reduced pressure and diluted with water; the product was extracted with ether, washed with water, dried over anhydrous sodium sulfate and the ether was evaporated. Recrystallization of the residue from acetone-hexane yielded the 21-acetate of 16α-trifluoromethyl-Δ$^4$-pregnene-17α,21-diol-3,20-dione.

A mixture of 1.16 g. of the above compound, 120 cc. of t-butanol, 2 cc. of pyridine and 600 mg. of selenium dioxide was refluxed under an atmosphere of nitrogen for 72 hours; after cooling the mixture was diluted with ethyl acetate and filtered through celite; the filtrate was evaporated to dryness under reduced pressure, the residue was triturated with water and the solid collected, washed with water and dried. Recrystallization from methylene chloride-hexane afforded 560 mg. of the 21-acetate of 16α-trifluoromethyl-Δ$^{1,4}$-pregnadiene-17α,21-diol-3,20-dione.

*Example II*

A solution of the above compound in 20 cc. of methanol was mixed with 2.8 cc. of a 1% solution of potassium hydroxide in water and stirred at 0° C. under an atmosphere of nitrogen for 1 hour; it was then neutralized with acetic acid and the methanol was distilled under reduced pressure. The residue was triturated with water and the solid was collected, washed with water, dried and recrystallized from ethyl acetate-methanol, thus giving approximately 475 mg. of 16α-trifluoromethyl-Δ$^{1,4}$-pregnadiene-17α,21-diol-3,20-dione.

A strain of *Curvularia lunata* ATCC 13935, was grown in a Sabourini-glucose-agar medium (Difco). The growth obtained after incubating for a week at 25° C. was suspended in 5 cc. of sterile tap water. This suspension was divided in 5 portions of 1 cc. each which were employed for inoculating 5 Erlenmeyer flasks of 250 cc. capacity containing each 50 cc. of a culture medium of the following composition:

|  | G. |
|---|---|
| Glucose | 20 |
| (MH$_4$)$_2$HPO$_4$ | 5 |
| or |  |
| NaNO$_3$ | 3 |
| K$_2$HPO$_4$ | 1 |
| MgSO$_4$.7H$_2$O | 0.2 |
| KCl | 0.5 |
| ZnSO$_4$ | Traces |
| FeSO$_4$.7H$_2$O | Traces |

Distilled water to complete 1 lt.

The cultures were incubated under rotatory stirring for 72 hours at 25° C. The growth was homogenized for 1 minute in a Waring Blendor; 2 cc. portions of the suspension thus obtained were employed for inoculating approximately 100 Erlenmeyer flasks containing the same medium described above. The mixtures were incubated for 24 hours under rotatory stirring at 25° C. and 280 r.p.m.; to each flask there was added 0.5 cc. of a solution of 0.5 g. of 16α-trifluoromethyl-Δ$^{1,4}$-pregnadiene-17α,21-diol-3,20-dione in 50 cc. of 95% ethanol and the incubation was continued under the same conditions for 48 hours. The contents of the flasks were combined and extracted with four portions of methylene chloride. The combined extract was dried over anhydrous sodium sulfate and concentrated at low temperature to a volume of 25 cc. This solution was absorbed on 4 g. of silica gel and eluted with methylene chloride acetone (9:1) to produce 200 mg. of pure 16α-trifluoromethyl-prednisolone. The latter was treated with 2 cc. of pyridine and a few drops of acetic anhydride and kept overnight; after diluting with water the solid was collected by filtration and recrystallized from methylene chloride-methanol, thus giving the 21-acetate of 16α-trifluoromethyl-prednisolone.

*Example III*

A solution of 4 g. of the acetate of 16α-trifluoromethyl-Δ$^4$-pregnene-17α,21-diol-3,20-dione, obtained in accordance with the method of Example 1, in 150 cc. of methanol and 7 cc. of a 4% aqueous solution of potassium hydroxide was stirred for 1 hour under an atmosphere of nitrogen at 0° C.; the mixture was neutralized with acetic acid and the methanol was distilled under reduced pressure. The residue was triturated with water and the solid was collected, washed with water, dried and recrystallized from ethyl acetate-methanol, thus producing 3.05 g. of 16α-trifluoromethyl-Δ$^4$-pregnene-17α,21-diol-3,20-dione.

There were prepared the following solutions "A," "B" and "C" using distilled water as solvent; for preparing solution "A" there were mixed 425 cc. of 1.74% dipotassium hydrogen phosphate (K$_2$HPO$_4$) and 75 cc. of a 1.38% solution of sodium dihydrogen phosphate (NaH$_2$PO$_4$); solution "B" was obtained by dissolving 45 g. of sodium chloride, 2.3 g. of potassium chloride and 1.91 g. of magnesium sulfate in water and diluting to a volume of 5 lt.; solution "C" was obtained by dissolving 20.9 g. of fumaric acid and 14.4 g. of sodium hydroxide in 1.2 lt. of water. There were then mixed 475 cc. of solution "A," 4.32 lt. of solution "B" and all of the solution "C."

The adrenal glands of recently slaughtered bovine were defatted and ground in a meat grinder to obtain an homogeneous mass; to 3 kg. of this mass was added the mixture of solutions "A," "B" and "C" and after stirring vigorously there was added 3 g. of 16α-trifluoromethyl-Δ$^4$-pregnene-17α,21-diol-3,20-dione dissolved in 16 cc. of propylene glycol. The mixture was stirred at 28-37° C. for 3 hours and then treated with 80 lt. of acetone and stirred for 1 hour further at room temperature.

The solid was filtered, washed with two portions of 10 lt. each of acetone which were combined and concentrated under reduced pressure to a volume of approximately 5 lt., taking care that the temperature did not rise over 30° C. The solution was then washed with 3 portions of 4 lt. each of hexane, which was discarded; it was then extracted with 2 portions of 3 lt. of methylene chloride and the extract was washed with water, dried over anhydrous sodium sulfate, filtered and concentrated to a volume of 300 cc. under reduced pressure and maintaining the temperature below room temperature. The concentrated solution was allowed to pass through a column of a mixture of 90 g. of silica gel and 90 g. of celite. The column was washed with 3 lt. of methylene chloride and then with 1 lt. of methylene chloride-acetone (90:10). The product was eluted with mixtures of methylene chloride and acetone (80:20 and 70:30), the solvent was evaporated and the residue crystallized from ethyl acetate. There was thus obtained 16α-trifluoromethyl-hydrocortisone.

A mixture of 1 g. of the above compound, 10 cc. of pyridine and 2 cc. of anhydride was kept for 3 hours at room temperature and then diluted with water; the solid was collected by filtration and crystallized from methylene chloride-methanol, thus giving 1.05 g. of the 21-acetate of 16α-trifluoromethyl-hydrocortisone.

A mixture of 1 g. of the above compound, 50 cc. of t-butanol, 0.4 g. of recently sublimed selenium dioxide and 0.2 cc. of pyridine was refluxed under an atmosphere of nitrogen for 48 hours, cooled, filtered through celite and the filtrate was evaporated under reduced pressure. The residue was refluxed with acetone and recolorizing charcoal for 1 hour, filtered through celite and the solvent was evaporated. By chromatography of the residue on neutral alumina there was obtained the 21-acetate of 16α-trifluoromethyl-prednisolone, identical with the final product of Example II.

*Example IV*

A mixture of 3 g. of the 21-acetate of 16α-trifluoromethyl-hydrocortisone, obtained in accordance with Example III, 60 cc. of recently distilled dimethylformamide, 3.6 cc. of pyridine and 2.4 cc. of methanesulfonyl chloride was heated for 2 hours at 90° C. The cooled mixture was poured into aqueous saturated sodium bicarbonate solution and the produce was extracted with methylene chloride; the extract was washed with water, dried over anhydrous sodium sulfate and the solvent was evaporated. The residue was chromatographed on 90 g. of silica gel, eluting the product with methylene chloride-acetone (9:1); recrystallization of the product from methylene chloride-methanol yielded 1.6 g. of the 21-acetate of 16α-trifluoromethyl-Δ$^{4,9(11)}$-pregnadiene-17α,21-diol-3,20-dione.

A mixture of 1.38 g. of the above compound and 15 cc. of dioxane was treated with 1.9 cc. of a 0.5 N aqueous solution of perchloric acid and 600 mg. of N-bromoacetamide, adding the latter in the dark, in 3 portions, over a period of half an hour and under continuous stirring. The mixture was stirred in the dark for 1¾ hours further, the excess or reagent was destroyed by the addition of aqueous sodium bisulfite solution, ice water was added and the product extracted with methylene chloride; the extract was washed with water, dried over anhydrous sodium sulfate and the solvent was evaporated under reduced pressure, thus affording the crude 21-acetate of 16α-trifluoromethyl-9α-bromo-hydrocortisone under the form of a yellow oil.

The above crude bromohydrin was refluxed for 6 hours with 2.5 g. of potassium acetate in 60 cc. of acetone. The acetone was distilled, water was added to the residue and the product was extracted with methylene-chloride. The extract was washed with water, dried over anhydrous sodium sulfate and the solvent was evaporated. Recrystallization of the residue from methanol yielded 900 mg. of the 21-acetate of 16α-trifluoromethyl-9β, 11β-oxido-Δ$^4$-pregnene-17α, 21-diol-3, 20-dione.

To a solution of 1.6 g. of anhydrous hydrogen fluoride in 2.85 g. of tetrahydrofurane and 10 cc. of methylene chloride, cooled to −60° C., was added a solution of 650 mg. of the above epoxide in 20 cc. methylene chloride. The mixture was kept at −10° C. for 72 hours, poured into aqueous saturated sodium bicarbonate solution and the organic layer was separated, washed with water, dried over anhydrous sodium sulfate and evaporated. The residue was reacetylated by heating for 1 hour on the steam bath with 3 cc. of acetic anhydride and 6 cc. of pyridine. The liquid was evaporated under reduced pressure and the residue was chromatographed on 30 g. of silica gel. Upon elution with methylene chloride-acetone (9:1), followed by crystallization of the residue from methylene chloride-methanol, there was obtained 290 mg. of the 21-acetate of 16α-trifluoromethyl-9α-fluoro-hydrocortisone.

By dehydrogenation with selenium dioxide, in accordance with the method described in the last paragraph of the preceding example, there was obtained the 21-acetate of 16α-trifluoromethyl-9α-fluoroprednisolone.

100 mg. of the 21-acetate of 16α-trifluoromethyl-9α-fluoroprednisolone was treated with 30 mg. of chromium trioxide in 5 cc. of 80% acetic acid, with stirring and at room temperature for 1 hour. After diluting with water the precipitate was collected, washed and crystallized from acetone-hexane, thus giving the 21-acetate of 16α-trifluoromethyl-9α-fluoro-prednisone.

*Example V*

By oxidation of the 21-acetate of 16α-trifluoromethyl-9α-fluoro-hydrocortisone (cf. Example IV) with chromic acid, in accordance with the method described in the preceding example, there was obtained the 21-acetate of 16α-trifluoromethyl-9α-fluoro-cortisone.

Similarly, the 21-acetate of 16α-trifluoromethyl-prednisolone (Example II) was converted into the 21-acetate of 16α-trifluoromethyl-prednisone, and the 21-acetate of 16α-trifluoromethyl-hydrocortisone (Example III) was converted into the 21-acetate of 16α-trifluoromethyl-cortisone.

*Example VI*

To a polyethylene bottle containing 119 g. of anhydrous tetrahydrofurane was added 70 g. of anhydrous hydrogen fluoride. The mixture was cooled to −70° C. in a Dry Ice-acetone bath and, under vigorous stirring there was added a mixture, previously cooled to −70° C., at 10 g. of 16α - trifluoromethyl - Δ$^5$-pregnene-3β, 17α-diol-20-one and 5.0 g. of N-bromoacetamide in 350 ml. of anhydrous methylene chloride distilled over calcium chloride. The mixture was stirred at −70° C. for 4 hours, poured into aqueous saturated sodium carbonate solution and the precipitate was filtered. The organic layer was separated, the aqueous phase was extracted with several portions of methylene chloride and the extracts were combined, washed with water to neutrality, dried over anhydrous sodium sulfate and evaporated to dryness under vacuum. The original precipitate and the residue of the evaporation were combined and crystallized from acetone, thus affording 9.3 g. of 16α-trifluoromethyl-5α-bromo-6β-fluoro-pregnane-3β, 17α-diol-20-one.

A solution of 2 g. of the above compound in 100 cc. of acetone was cooled to 0° C. and treated under an atmosphere of nitrogen under stirring with a solution of 8 N chromic acid until the color of the reagent persisted in the mixture. The mixture was then stirred for 10 minutes more at room temperature, diluted with water and the precipitate was collected, washed with water and dried under vacuum, thus affording 5α-bromo-6β-fluoro-16α-trifluoromethyl-pregnane-17α-ol-3,20-dione.

The above product was dissolved in methanol and the reaction mixture was treated with 4 g. of anhydrous sodium acetate and refluxed for several hours. The mixture was evaporated to dryness under reduced pressure, water was added to the residue and the precipitate that formed was collected, washed with water, dried and treated with decolorizing charcoal in acetone solution. The charcoal was removed by filtration, the acetone was evaporated and the residue was crystallized from ethyl acetate-hexane. There was thus obtained 6β-fluoro-16α-trifluoromethyl-Δ$^4$-pregnen-17α-ol-3,20-dione.

A slow stream of dry hydrogen chloride was introduced for 4 hours into a solution of 1 g. of the above compound in 100 cc. of glacial acetic acid, maintaining the temperature around 20° C. The mixture was then poured into ice water and the precipitate was collected by filtration washed with water, dried and recrystallized from ethyl acetate-hexane thus yielding 6α-fluoro-16α-trifluoromethyl-Δ$^4$-pregnen-17α-ol-3,20-dione.

A mixture of 1.5 g. of the above compound, 120 cc. of tertiary butanol, 2 cc. of pyridine and 600 mg. of selenium dioxide was refluxed under an atmosphere of nitrogen for 72 hours. After cooling, the mixture was diluted with ethyl acetate and filtered through celite; the filtrate was evaporated to dryness under reduced pressure, the residue was triturated with water and the solid collected, washed with water and dried. Recrystallization from methylene chloride-hexane afforded 6α-fluoro-16α-trifluoromethyl-Δ$^{1,4}$-pregnadien-17α-ol-3,20-dione.

Example VII

By following the method described in Example I except that 16α - trifluoromethyl - Δ⁴ - pregnen-17α-ol-3,20-dione was replaced by 6α-fluoro-16α-trifluoromethyl-Δ⁴-pregnen-17α-ol-3,20-dione, prepared in the preceding example, there were obtained 6α-fluoro-16α-trifluoromethyl-21 - iodo - 17α - hydroxy-Δ⁴-pregnene-3,20-dione and 6α-fluoro - 16α - trifluoromethyl - Δ⁴ - pregnene-17α,21-diol-3,20-dione 21-acetate.

800 mg. of the latter compound were dissolved in 16 cc. of methanol and the solution was treated at 0° C. with a solution of 270 mg. of sodium carbonate in 1.6 cc. of water, under an atmosphere of nitrogen and under stirring. After 2½ hours the mixture was neutralized with acetic acid and the solid was collected, washed with water and dried. There was thus obtained 630 mg. of 16α-trifluoromethyl - 6α - fluoro - Δ⁴ - pregnene - 17α,21 - diol - 3,20-dione.

There were prepared additional quantities of the 21-acetate of 16α - trifluoromethyl - 6α - fluoro-Δ⁴-pregnene-17α,21-diol-3,20-dione. 1 g. of this compound was dehydrogenated to the 21-acetate of 16α-trifluoromethyl-6α-fluoro-Δ¹,⁴-pregnadiene-17α,21-diol-3,20-dione by the reaction with selenium dioxide described in Example I. The product was then hydrolyzed to the free 16α-trifluoromethyl - 6α - fluoro - Δ¹,⁴ - pregnadiene - 17α,21-diol-3,20-dione by following the procedure of hydrolysis described above. The remaining 21-acetate of 16α-trifluoromethyl - 6α - fluoro - Δ⁴ - pregnene - 17α,21 - diol-3,20-dione was converted into the free 16α-trifluoromethyl-6α-fluoro-Δ⁴-pregnene-17α,21-diol-3,20-dione.

The 16α-trifluoromethyl-6α-fluoro-derivatives of Δ⁴-pregnene-17α,21-diol-3,20-dione and of the 1-dehydro derivatives were then subjected to the reactions described in the case of the 16α-trifluoromethyl derivatives without the fluorine substituent at C-6α.

In accordance with the process described in Example II, by the incubation with *Curvularia lunata* ATCC 13935 16α - trifluoromethyl - 6α - fluoro - Δ¹,⁴ - pregnadien-17α,21-diol-3,20-dione afforded 16α-trifluoromethyl-6α-fluoro-prednisolone; by incubation with adrenal glands, in accordance with the method described in Example III, 16α - trifluoromethyl - 6α - fluoro - Δ⁴ - pregnene - 17α,21-diol-3,20-dione was converted into 16α-trifluoromethyl-6α-fluoro-hydrocortisone. In other experiments there was effected the 11β-hydroxylation of 16α-trifluoromethyl-6α-fluoro-Δ⁴-pregnene-17α,21-diol-3,20-dione by the incubation with *Curvularia lunata*, and that of its 1-dehydro analog by incubation with adrenal glands.

By the reactions of Example II there was then prepared the 21-acetate of 16α-trifluoromethyl-6α-fluoro-prednisolone, and by the reactions described in Example III there was prepared the 21-acetate of 16α-trifluoromethyl-6α-fluoro-hydrocortisone, and again the 21-acetate of 16α-trifluoromethyl-6α-fluoro-prednisolone.

In accordance with the method described in Example IV there were obtained: the 21-acetates of 16α-trifluoromethyl - 6α - fluoro - Δ⁴,⁹(¹¹) - pregnadiene - 17α,21 - diol-3,20 - dione, of 16α-trifluoromethyl-6α-fluoro-9α-bromo-hydrocortisone, of 16α-trifluoromethyl-6α-fluoro-9β,11β-oxido - Δ⁴ - pregnene - 17α,21-diol-3,20-dione, of 16α-trifluoromethyl - 6α,9α - difluoro-hydrocortisone, of 16α-trifluoromethyl-6α,9α-difluoro-prednisolone and of 16α-trifluoromethyl-6α,9α-difluoro-prednisone.

In accordance with the method described in Example IV there was oxidized the 21-acetate of 16α-trifluoromethyl-6α,9α-difluoro-hydrocortisone to the 21-acetate of 16α-trifluoromethyl-6α,9α-difluoro-cortisone and the 21-acetate of 16α-trifluoromethyl - 6α,9α - difluoro-prednisolone to the 21-acetate of 16α-trifluoromethyl-6α,9α-difluoro-prednisone.

The methods described in Examples I through IV were repeated starting from the acetate of the 6-methyl derivative of Δ⁵,¹⁶-pregnadien-3β-ol-20-one. There were thus obtained:

6-methyl-16α-trifluoromethyl-3β,20-diacetoxy-Δ⁵,¹⁷(²⁰)-pregnadiene,
3,20-diacetoxy-6-methyl-16α-trifluoromethyl-5,6;17,20-bis-oxido-pregnane,
6-methyl-16α-trifluoromethyl-17α-hydroxy-Δ⁴-pregnene, 3,20-dione, the 21-acetate of 6α-methyl-16α-trifluoromethyl-Δ⁴-pregnene-17α,21-diol-3,20-dione, the 21-acetate of 6α-methyl-16α - trifluoromethyl - Δ¹,⁴ - pregnadiene - 17α,21 - diol-3,20-dione, 6α - methyl - 16α - trifluoromethyl - Δ⁴ - pregnene-17α,21-diol-3,20-dione and 6α-methyl-16α-trifluoromethyl-Δ¹,⁴-pregnadiene-17α,21-diol-3,20-dione.

Example VIII

The methods described in Examples I through IV were repeated starting from 6-methyl-16α-trifluoromethyl-Δ⁵-pregnene-3β,17α-diol-20-one, described in our aforesaid copending application. There were thus obtained 6α-methyl - 16α - trifluoromethyl - Δ⁴ - pregnen - 17α - ol-3,20-dione, the 21-acetate of 6α - methyl - 16α - trifluoromethyl-Δ⁴-pregnene-17a,21-diol-3,20-dione, the 21-acetate of 6α - methyl - 16α - trifluoromethyl-Δ¹,⁴-pregnadiene-17α,21-diol-3,20-dione and the free 6α-methyl-16α-trifluoromethyl-Δ⁴-pregnene-17α,21-diol-3,20-dione and 1-dehydro-derivative thereof.

A portion of the 21-acetate of 6α-methyl-16α-trifluoromethyl-Δ⁴-pregnene - 17α,21 - diol-3,20-dione mentioned above, was subjected to the transformations described in Example III (starting from the 21-acetate of 16α-trifluoromethyl-Δ⁴-pregnene-17α,21-diol-3,20-dione); there were thus obtained the free 6α-methyl-16α-trifluoromethyl-Δ⁴-pregnene-17α,21-diol-3,20-dione, then 6α-methyl-16α-trifluoromethyl-hydrocortisone, its 21-acetate and, again, the 21-acetate of 6α-methyl-16α-trifluoromethyl-prednisolone.

By reactions described in Example IV, from the 21-acetate of 6α-methyl-16α-trifluoromethyl-hydrocortisone there were obtained: the 21-acetates of 6α-methyl-16α-trifluoromethyl - Δ⁴,⁹(¹¹) - pregnadiene - 17α,21 - diol-3,20-dione, of 6α - methyl - 16α - trifluoromethyl - 9α-bromo-hydrocortisone, of 6α - methyl - 16α - trifluoromethyl - 9β,11β - oxido - Δ⁴ - pregnene - 17α,21 - diol-3,20-dione, of 6α - methyl - 16α - trifluoromethyl - 9α-fluoro-prednisolone and of 6α-methyl-16α-trifluoromethyl-9α-fluoro-prednisone.

By reactions described in Example V there was oxidized the 21-acetate of 6α-methyl-16α-trifluoromethyl-hydrocortisone to the 21-acetate of 6α-methyl-16α-trifluoromethyl-cortisone; the 21-acetate of 6α-methyl-16α-trifluoromethyl-9α-fluoro-hydrocortisone was oxidized to the 21-acetate of 6α - methyl - 16α - trifluoromethyl - 9α-fluoro-cortisone, and the 21-acetate of 6α-methyl-16α-trifluoromethyl-prednisolone to the 21-acetate of 6α-methyl-16α-trifluoromethyl-prednisone.

Example IX

By the method of alkaline hydrolysis described in Example II, or by an alkaline hydrolysis as described in Example VII, the 21-acetate of the 16α-trifluoromethyl, 16α - trifluoromethyl - 6α-fluoro, 6α-methyl-16α-trifluoromethyl, 16α - trifluoromethyl - 9α - fluoro, 16α-trifluoromethyl-6,9α-difluoro and 6α-methyl-16α-trifluoromethyl-9α-fluoro derivatives of cortisone and prednisone were converted into the corresponding free compounds. There were thus obtained all of the 16α-trifluoromethyl hormones under the form of the free alcohols.

Example X

A mixture of 1 g. of 16α-trifluoromethyl-hydrocortisone, 2 cc. of propionic anhydride and 5 cc. of pyridine was kept at room temperature for 12 hours. It was then poured into 100 cc. of water, heated for 30 minutes on the steam bath, cooled and the precipitate was collected by filtration. The precipitate was washed with water to neutrality, dried and crystallized from acetone-hexane. There was thus obtained the 21-propionate of 16α-trifluoromethyl-hydrocortisone.

Exactly as described above there were prepared the 21-propionates of the 16α-trifluoromethyl derivatives of cortisone, prednisone, and prednisolone, as well as the 21-propionates of the 16α-trifluoromethyl-6α-fluoro, 6α-methyl-16α-trifluoromethyl, 16α-trifluoromethyl-9α-fluoro, 16α-trifluoromethyl-6α,9α-difluoro, and 6α-methyl-16α-trifluoromethyl-9α-fluoro derivatives of hydrocortisone, prednisolone, cortisone, and prednisone.

*Example XI*

By using cyclopentylpropionic anhydride instead of propionic anhydride in the method of esterification described in Example X, there were obtained the 21-cyclopentylpropionates of the compounds set forth in such example.

*Example XII*

By using benzoyl chloride instead of propionic anhydride in the method of esterification described in Example X, there were obtained the 21-benzoates of the compounds set forth in such example.

*Example XIII*

A mixture of 10 g. of 16α-trifluoromethyl-$\Delta^5$-pregnene-3β,17α-diol-20-one (cf. Example I), 80 cc. of ethylene glycol, 2 liters of dry benzene and 1.5 g. of p-toluenesulfonic acid monohydrate was refluxed for 18 hours, using a Dean-Stark water separator. The cooled mixture was treated with 5% aqueous sodium bicarbonate, the organic phase was separated, washed with water, dried over anhydrous sodium sulfate and the solvent was evaporated. Crystallization of the residue from acetone afforded 16α-trifluoromethyl-20-ethylenedioxy-$\Delta^5$-pregnen-3β,17α-diol.

A solution of 8 g. of the above compound in 1600 cc. of methylene chloride was cooled to 0° C. and mixed with an ether solution of 6.0 g. of monoperphthalic acid. The mixture was kept at 0° C. for 16 hours, then diluted with water; the organic layer was separated, washed with aqueous sodium bicarbonate solution and then with water to neutrality, dried over anhydrous sodium sulfate and the solvent was evaporated. The residue was purified by crystallization from acetone-hexane. There was thus obtained 16α-trifluoromethyl-5α,6α-oxido-20-ethylenedioxy-pregnane-3β,17α-diol.

A mixture of 5 g. of the above compound and 5 molar equivalents of methylmagnesium bromide in 500 cc. of dry benzene was refluxed for 3 hours, then poured under vigorous stirring into a mixture of 1 liter of 20% aqueous ammonium chloride solution and 1 kg. of ice. The benzene layer was separated, washed with water, dried over anhydrous sodium sulfate and the benzene was evaporated, finally under reduced pressure. The residue was treated with 100 mg. of p-toluenesulfonic acid monohydrate and 300 cc. of acetone and kept at room temperature for 16 hours, diluted with water and the solid collected, thus giving the crude 6β-methyl-16α-trifluoromethyl-pregnane-3β,5α,17α-triol-20-one. The latter was oxidized with 8 N chromic acid, in accordance with the method described in Example I, to produce 6β-methyl-16α-trifluoromethyl-pregnane-5α,17α-diol-3,20-dione, which, without further purification, was treated with 250 cc. of 1% methanolic potassium hydroxide under an atmosphere of nitrogen and at room temperature for 8 hours. After acidifying with acetic acid the mixture was concentrated to a small volume under reduced pressure and the product was precipitated by the addition of water. The solid was collected, washed with water and crystallized from acetone-hexane. There was thus obtained 6α-methyl-16α-trifluoromethyl-$\Delta^4$-pregnen-17α-ol-3,20-dione, identical, with the intermediate of Example VIII.

*Example XIV*

By substituting in Example I the 16α-trifluoromethyl-$\Delta^5$-pregnene-3β,17α-diol-20-one by 16α-monofluoromethyl-$\Delta^5$-pregnene-3β,17α-diol-20-one, described in our aforementioned copending application, and applying the methods described in Examples I through V, there were obtained 16α-monofluoromethyl-$\Delta^4$-pregnen-17α-ol-3,20-dione,
16α-monofluoromethyl-17α-hydroxy-21-iodo-$\Delta^4$-pregnene-3,20-dione,
16α-monofluoromethyl-$\Delta^4$-pregnene-17α,21-diol-3,20-dione-21-acetate,
16α-monofluoromethyl-$\Delta^{1,4}$-pregnadiene-17α,21-diol-3,20-dione-21-acetate,
16α-monofluoromethyl-$\Delta^{1,4}$-pregnadiene-17α,21-diol-3,20-dione,
16α-monofluoromethyl-$\Delta^4$-pregnene-17α,21-diol-3,20-dione,
16α-monofluoromethyl-prednisolone,
16α-monofluoromethyl-prednisolone-21-acetate,
16α-monofluoromethyl-hydrocortisone and its C-21 acetate,
16α-monofluoromethyl-9α-fluoro-hydrocortisone-21-acetate,
16α-monofluoromethyl-9α-fluoro-prednisolone-21-acetate,
16α-monofluoromethyl-9α-fluoro-prednisone-21-acetate,
16α-monofluoromethyl-9α-fluoro-cortisone-21-acetate,
16α-monofluoromethyl-prednisone-21-acetate and
16α-monofluoromethyl-cortisone-21-acetate.

*Example XV*

By substituting in Example VI the 16α-trifluoromethyl-$\Delta^5$-pregnene-3β,17α-diol-20-one by 16α-monofluoromethyl-$\Delta^5$-pregnene-3β,17α-diol-20-one there was obtained the intermediates 6α-fluoro-16α-monofluoromethyl-$\Delta^4$-pregnen-17α-ol-3,20-dione and the 1-dehydro derivative thereof and by then following the method of Example VII there were obtained all of the corresponding compounds having a monofluoromethyl group at C-16α in place of the trifluoromethyl group at C-16α.

*Example XVI*

By applying the method described in Example VIII to 6-methyl-16α-monofluoromethyl-$\Delta^5$-pregnene-3β,17α-diol-20-one instead of 6-methyl-16α-trifluoromethyl-$\Delta^5$-pregnen-3β,17α-diol-20-one, there were obtained 6α-methyl-16α-monofluoromethyl-$\Delta^4$-pregnene-17α-ol-3,20-dione, the 21-acetate of and the free compound 6α-methyl-16α-monofluoromethyl-$\Delta^4$-pregnene-17α,21-diol-3,20-dione, the 21-acetate of and the free compound 6α-methyl-16α-monofluoromethyl-$\Delta^{1,4}$-pregnadiene-17α,21-diol-3,20-dione, 6α-methyl-16α-monofluoromethyl-hydrocortisone and its 21-acetate, the 21-acetate of 6α-methyl-16α-monofluoromethyl-prednisolone, 6α-methyl-16α-monofluoromethyl-9α-fluoro-prednisolone-21-acetate, 6α-methyl-16α-monofluoromethyl-9α-fluoro-prednisone-21-acetate, and the 21-acetates of 6α-methyl-16α-monofluoromethyl-cortisone, of 6α-methyl-16α-monofluoromethyl-9α-fluoro-cortisone, and 6α-methyl-16α-monofluoromethyl-prednisone.

*Example XVII*

By applying the method of alkaline hydrolysis described in Example I or by alkaline hydrolysis as described in Example VII, the 21-acetates of the 16α-monofluoromethyl, 6α-fluoro-16α-monofluoromethyl, 6α-methyl-16α-monofluoromethyl, 9α-fluoro-16α-monofluoromethyl, 6α,9α-difluoro-16α-monofluoromethyl, and 6α-methyl-9α-fluoro-16α-monofluoromethyl derivatives of cortisone and prednisone were converted into the corresponding free compounds.

*Example XVIII*

By applying the methods described in Examples X, XI and XII to the corresponding 16α-monofluoromethyl compounds there were obtained the C-21-propionates, C-21-cyclopentylpropionates and C-21-benzoates of 16a-mono-fluoromethyl-hydrocortisone, 16a-monofluoromethyl-cortisone, 16α-monofluoromethyl-prednisone, 16α-monofluoromethyl-prednisolone as well as the 6α-methyl-16α-monofluoromethyl, 6α-fluoro-16α-monofluoromethyl, 9α-fluoro-16α - monofluoromethyl, 6α,9α - difluoro-16α-monofluoromethyl, and 6α-methyl-9α-fluoro-16α-monofluoromethyl derivatives of hydrocortisone, prednisolone, cortisone and prednisone.

*Example XIX*

A mixture of 1 g. of the 3-benzoate-20-acetate of $\Delta^5$-pregnene-3β,20β-diol-16α-carboxylic acid, described in our aforementioned copending application and 5 cc. of oxalyl chloride was refluxed under anhydrous conditions during 2 hours. The solution was evaporated in vacuum, 2 portions of dry benzene were added and reevaporated to eliminate traces of oxalyl chloride. The above crude acid chloride was dissolved in 20 cc. of anhydrous tetrahydrofurane, cooled to —75° C. in a Dry-Ice-acetone bath and treated with a previously cooled solution of 600 mg. of lithium aluminum t-butoxide in 20 cc. of anhydrous tetrahydrofurane. The reaction mixture was kept at —75° C. for 1 hour and then at room temperature for 30 minutes, poured into ice water and extracted several times with ethyl acetate, washed with water to neutral, dried over anhydrous sodium sulfate and evaporated to dryness under vacuum. After chromatography there was obtained the 3-benzoate of $\Delta^5$-pregnene-3β,20β-diol-16α-carboxaldehyde.

A solution of 500 mg. of the above aldehyde in 100 cc. of benzene was treated with 1 g. of sulfur tetrafluoride and the mixture kept in a sealed steel tube for 48 hours at room temperature, it was then poured carefully into ice water. An excess of sodium bicarbonate was added and the product extracted with methylene chloride. The extract was washed with water to neutral, dried and evaporated to dryness. After chromatography and crystallization of the solid fractions from acetone-hexane there was obtained 16α - difluoromethyl-$\Delta^5$-pregnene-3β,20β-diol-3-benzoate-20-acetate.

For the next step there were combined several batches of the above compound.

*Example XX*

A solution of 5 g. of 16a-difluoromethyl-$\Delta^5$-pregnene-3β,20β-diol-3-benzoate-20-acetate in 200 cc. of methanol was treated with 2.5 g. of potassium carbonate dissolved in 20 cc. of water and the mixture kept at room temperature for 12 hours. The reaction mixture was neutralized with acetic acid and concentrated under vacuum to one-third its volume, poured into water, the formed precipitate filtered washed with water to neutral and dried, thus giving 16α-difluoromethyl-$\Delta^5$-pregnene-3β,20β-diol-3-benzoate.

The above crude product was dissolved in 100 cc. of acetone, cooled to 0° C. and treated dropwise under an atmosphere of nitrogen under stirring with an 8 N chromic acid solution (prepared as in Example I) until the color of the reagent persisted in the mixture, stirred for 10 minutes further at room temperature, diluted with water and the precipitate collected, washed with water and dried under vacuum, thus affording 16α-difluoromethyl-$\Delta^5$-pregnen-3β-ol-20-one benzoate.

A solution of 3.3 g. of the above compound in 250 ml. of acetic anhydride containing 1.3 g. of p-toluenesulfonic acid was subjected to a slow distillation over a period of 8 hours, the residue was poured into ice water and the product was extracted with ether. The extract was consecutively washed with 5% aqueous sodium carbonate solution and water, dried over anhydrous sodium sulfate and the ether was evaporated. There was thus obtained 16α-difluoromethyl-$\Delta^{5,17(20)}$-pregnadiene - 3β,20 - diol-3-benzoate-20-acetate.

A solution of the above crude enol acetate in 30 cc. of ether was treated with 100 cc. of a 1 N solution of monoperphthalic acid and the mixture was kept at room temperature for 3 days; at the end of this time it was consecutively washed with dilute sodium chloride solution, sodium carbonate, sodium iodide, sodium thiosulfate and finally with sodium chloride solution; the ether solution was dried over anhydrous sodium sulfate and evaporated to dryness, thus yielding a mixture of 5α,6α,17,20-bis - oxido - 16α - difluoromethyl - 3β - benzoyloxy - 20-acetoxy-pregnane and of its 5β,6β-isomer. This mixture was dissolved in 150 cc. of methanol, treated with 1.5 g. of potassium hydroxide dissolved in 15 cc. of water and refluxed for 3 hours; the mixture was neutralized with acetic acid, concentrated to one-third its volume, poured into ice water and the precipitate formed was collected and dried.

The above crude product was added to a mixture of 2.8 g. of sodium iodide, 0.95 g. of anhydrous sodium acetate, 2.8 g. of zinc dust, 11 cc. of acetic acid and 0.4 cc. of water; the mixture was stirred at room temperature for 3 hours, the zinc was removed by filtration and the solution was poured into ice water. The precipitate formed was collected, washed with water to neutrality, dried, dissolved in 70 cc. of hot dimethyl-formamide, filtered through celite to remove traces of zinc and then hot water was added to crystallize the product; after cooling in ice the precipitate was collected by filtration and washed with methanol, thus affording 1.6 g. of 16α-difluoromethyl-$\Delta^5$-pregnene-3β,17α-diol-20-one.

*Example XXI*

A solution of 1.5 g. of the above compound in 20 cc. of acetone was oxidized with 8 N chromic acid solution in accordance with the method of Example I, the crude product was dissolved in 50 cc. of methanol and treated at room temperature with a solution of 150 mg. of oxalic acid in 1.5 cc. of water. The mixture was kept standing for 3 hours, then treated with water and the product was collected by filtration, washed with water to neutral and dried. There was thus obtained 16α-difluoromethyl-17α-hydroxy-$\Delta^4$-pregnene-3,20-dione.

By following the method of Example I, the above compound was converted into 16α-difluoromethyl-17α-hydroxy - 21-iodo-$\Delta^4$-pregnene-3,20-dione, 16α-difluoromethyl-$\Delta^4$-pregnene-17α,21-diol-3,20-dione 21-acetate and 16α-difluoromethyl-$\Delta^{1,4}$-pregnadiene-17α,21-diol-3,20-dione.

By the methods of alkaline hydrolysis described in Example II or in Example VII, the above 21-acetates were converted into the corresponding free compounds. After incubation with adrenal glands, in accordance with the method of Example III there were obtained 16α-difluoromethyl-hydrocortisone and 16α-difluoromethyl-prednisolone.

*Example XXII*

A mixture of 500 mg. of 16α-difluoromethyl-hydrocortisone, 10 cc. of dioxane and 350 mg. of 2,3-difluoro-5,6-dicyano-1,4-benzoquinone was refluxed for 18 hours. It was then cooled, the 2,3-dichloro-5,6-dicyano-1,4-benzohydroquinone formed during the reaction filtered off and the filtrate evaporated to dryness. The residue was dissolved in acetone and filtered through 10 g. of alumina. Crystallization from acetone-hexane gave 16α-difluoromethyl-prednisolone identical with that obtained in the preceding example.

*Example XXIII*

By following the method of Example VI, 5 g. of 16α-difluoromethyl - $\Delta^5$-pregnene-3β,17α-diol-20-one obtained as described in Example XX was converted into 6α-fluoro-16α-difluoromethyl-$\Delta^4$-pregnen-17α-ol-20-one.

By following the acetoxylation method described in Example I the above compound was converted into 6α-fluoro - 16α - difluoromethyl - 21 - iodo-17α-hydroxy-$\Delta^4$- pregnene-3,20-dione and 6α-fluoro-16α-trifluoromethyl-Δ⁴-pregnene-17α,21-diol-3,20-dione 21-acetate.

3.2 g. of the latter compound were dissolved in 60 cc. of methanol and the solution was treated at 0° C. with a solution of 1 g. of sodium carbonate in 6 cc. of water, under an atmosphere of nitrogen and under stirring. After 2½ hours the mixture was neutralized with acetic acid and the solid collected, washed with water and dried. There was thus obtained 630 mg. of 16α-difluoromethyl-6α-fluoro-Δ⁴-pregnene-17α,21-diol-3,20-dione.

In accordance with the process described in Example II, by the incubation with *Curvularia lunata* ATCC 13935, 16α - trifluoromethyl - 6α-fluoro-Δ⁴-pregnene-17α,21-diol-3,20-dione afforded 16α-difluoromethyl-6α-fluoro-hydrocortisone.

750 mg. of the above compound were converted into the corresponding 21-acetate in a conventional manner. Further treatment with chromium trioxide in acetic acid solution, according to the method of Example IV gave 16α-difluoromethyl-6α-fluoro-cortisone acetate.

*Example XXIV*

By the reactions described in Example IV, from the 21-acetate of 6α - fluoro-16α-difluoromethyl-hydrocortisone there were obtained the 21-acetates of 6α-fluoro-16α-difluoromethyl - Δ⁴,⁹⁽¹¹⁾-pregnadiene-17α,21-diol-3,20-dione, of 6α-fluoro - 16α - difluoromethyl-9α-bromo-hydrocortisone, of 6α - fluoro-16α-difluoromethyl-9β,11β-oxido-Δ⁴-pregnene - 17α,21-diol-3,20-dione, of 6α,9α-difluoro-16α-difluoromethyl-hydrocortisone, of 6α,9α-difluoro-16α-difluoromethyl-prednisolone and of 6α,9α-difluoro-16α-difluoromethyl-prednisone.

*Example XXV*

To a solution of 500 mg. of 6α-fluoro-16α-difluoromethyl - 9β,11β-oxido-Δ⁴-pregnene-17α,21-diol-3,20-dione 21-acetate obtained as described in the preceding example in 10 cc. of redistilled chloroform was added 4 cc. of a 0.45 N solution of dry hydrogen chloride in chloroform, under continuous stirring and maintaining the temperature around 0° C. The mixture was then stirred at 0° C. for 1 hour further, diluted with water and the chloroform layer was separated, washed with aqueous sodium bicarbonate solution and then with water, dried over anhydrous sodium sulfate and the chloroform was evaporated under reduced pressure. Crystallization of the residue gave the acetate of 6α-fluoro-9α-chloro-16α-difluoromethyl-hydrocortisone.

By dehydrogenation with 2,3-dichloro-5,6-dicyano-1,4-benzoquinone, in accordance with the method of Example XXII, there was obtained 6α-fluoro-9α-chloro-16α-difluoromethyl-prednisolone acetate.

*Example XXVI*

A solution of 5 g. of 16α-difluoromethyl-17α-hydroxy-Δ⁴-pregnene-3,20-dione obtained as described in Example XXI in 40 cc. of peroxide-free dioxane and 5 cc. of freshly distilled ethyl orthoformate was treated with 150 mg. of p-toluenesulfonic acid and the mixture stirred for 1 hour. 0.8 cc. of pyridine was added and then poured into ice-salt water, the precipitate was collected and washed with water containing a few drops of pyridine, thus giving 16α-difluoromethyl-3-ethoxy-Δ³,⁵-pregnadien-17α-ol-20-one.

A mixture of the above enol ether, 2 g. of anhydrous sodium acetate and 100 parts of acetone was treated with 20 cc. of water and the solution was cooled to a temperature between 0 and 5° C.; there was then added 1.1 molar equivalents of N-chlorosuccinimide and 2 cc. of glacial acetic acid and the mixture was stirred between 0° and 5° C. for 30 minutes. It was then diluted with ice-salt water, kept standing over night in the refrigerator and the precipitate formed was collected, washed with water, dried under vacuum and recrystallized from acetone, There was thus obtained a 6β-chloro-16α-difluoromethyl-Δ⁴-pregnen-17α-ol-3,20-dione.

Into a solution of 1 g. of the above compound in 50 cc. of glacial acetic acid was passed a slow stream of dry hydrogen chloride for 4 hours, while maintaining the temperature around 15° C.; the mixture was then poured into ice-water, the precipitate was collected, washed with water, dried and recrystallized from acetone-hexane to give 6α - chloro-16α-difluoromethyl-Δ⁴-pregnen-17α-ol-3,20-dione.

By following the method of Example I, the above compound was converted into 6α-chloro-16α-difluoromethyl-17α-hydroxy-21-iodo-Δ⁴-pregnene-3,20 dione, 6α-chloro - 16α - difluoromethyl - Δ⁴-pregnene-17α,21-diol-3,20-dione acetate and 6α-chloro - 16α - difluoromethyl-Δ¹,⁴-pregnadiene-17α,21-diol-3,20-dione acetate.

*Example XXVII*

A solution of 500 mg. of the 21-acetate of 6α-chloro-16α-difluoromethyl-Δ⁴-pregnene-17α,21-diol-3,20-dione in 20 cc. of methanol was mixed with 2.8 cc. of a 1% solution of potassium hydroxide in water and stirred at 0° C. under an atmosphere of nitrogen for 1 hour; it was then neutralized with acetic acid and the methanol was distilled under reduced pressure. The residue was triturated with water and the solid was collected, washed with water, dried and recrystallized from ethyl acetate-methanol, thus giving approximately 430 mg. of 6α-chloro-16α-difluoromethyl-Δ⁴-pregnene-17α,21-diol-3,20-dione.

The above compound was incubated with adrenal glands in accordance with the method of Example III, thus affording 6α-chloro-16α-difluoromethyl-hydrocortisone.

Acetylation of the above compound in a conventional manner, followed by dehydrogenation with selenium dioxide, in accordance with the method of Example III gave the acetate of 6α-chloro-16α-difluoromethyl-prednisolone.

*Example XXVIII*

A mixture of 1 g. of 16α-monofluoromethyl-hydrocortisone acetate, 2 g. of chloranil, 15 cc. of ethyl acetate and 5 cc. of acetic acid was refluxed under an atmosphere of nitrogen for 96 hours. The mixture was cooled, washed with a cold aqueous solution of 10% sodium hydroxide until the washings were colorless. The organic solution was dried over anhydrous sodium sulfate and the ethyl acetate was evaporated. By chromatography of the residue on neutral alumina there was obtained the acetate of 16α-monofluoromethyl-Δ⁴,⁶-pregnadien-11β,17α,21-triol-3,20-dione.

In a similar manner, the 21-acetates of 6α-fluoro-16α-monofluoromethyl, 6α-methyl-16α-monofluoromethyl, 9α-fluoro - 16α - monofluoromethyl, 6α,9α-fluoro - 16α-monofluoromethyl, and 6α - methyl - 9α - fluoro - 16α - monofluoromethyl derivatives of cortisone and prednisone were converted into the corresponding 6-dehydro derivatives.

*Example XXIX*

By oxidation of the 21-acetate of 6α-chloro-16α-monofluoromethyl-hydrocortisone (cf. Example XXVI) with chromic acid, in accordance with the method of Example IV, there was obtained the 21-acetate of 6α-chloro-16α-difluoromethyl-cortisone.

1 g. of the above compound was treated with 2,3-dichloro-5,6-dicyano-1,4-benzoquinone by following the method of Example XXII thus giving 6α-chloro-16α-difluoromethyl-prednisone acetate.

400 mg. of the latter compound were dissolved in 8 cc. of methanol and the solution treated with 140 mg. of sodium carbonate in 1 cc. of water, under an atmosphere of nitrogen and under stirring, the mixture kept at room temperature for 1 hour and then neutralized with acetic acid, poured into ice water, the formed precipitate collected, washed with water and dried. There was thus obtained 6α-chloro-16α-difluoromethyl-prednisolone.

*Example XXX*

A solution of 5 g. of 16 α-trifluoromethyl-Δ⁵-pregnene-3β,17α-diol-20-one, obtained as described in our copending patent application Serial No. 63,265, filed of even date, in 500 cc. of methylene chloride was cooled to 0° C. and mixed with 1.5 molar equivalents of monoperphthalic acid in ether solution. The mixture was kept at 0° C. for 20 hours, diluted with water, the organic layer was separated, washed with aqueous sodium bicarbonate solution and then with water to neutral, dried over anhydrous sodium sulfate and evaporated to dryness. Crystallization from acetone-hexane gave 3.75 g. of the pure 16α - trifluoromethyl-5α,6α-oxido-pregnan-3β,17α-diol-20-one.

A solution of 3 g. of the above compound in 300 cc. of glacial acetic acid was treated with 6 cc. of concentrated hydrochloric acid and the mixture kept at room temperature for 6 hours. After dilution with ice-salt water, and filtration of the formed precipitate there was obtained 16α - trifluoromethyl-6β-chloro-pregnane-3β,5α,17α-triol-20-one. Upon oxidation with 8 N chromic acid solution by following the method of Example I there was obtained 16α-trifluoromethyl-6β-chloro-pregnane-5α,17α-diol-3,20-dione.

A slow stream of dry hydrogen chloride was introduced for 4 hours into a solution of 1 g. of the above compound in 100 cc. of glacial acetic acid, maintaining the temperature around 20° C.; the mixture was poured into ice water and the precipitate collected by filtration, washed with water, dried and recrystallized from acetone-ether thus yielding 6α-chloro-16α-trifluoromethyl-Δ⁴-pregnen-17α-ol-3,20-dione.

To a solution of 1 g. of the above compound in 7.5 cc. of tetrahydrofurane and 4.5 cc. of methanol was added under vigorous stirring 1.6 g. of calcium oxide and 1.6 g. of iodine; the stirring was continued at room temperature until the color of the solution became pale yellow and then the mixture was poured into ice water containing 4 cc. of acetic acid and 5 g. of sodium thiosulfate, stirred for 15 minutes, most of the liquid was separated by decantation and the precipitate was collected, washed with water and dried under vacuum. There was thus obtained 6α - chloro - 16α-trifluoromethyl-17α-hydroxy-21-iodo-Δ⁴-pregnene-3,20-dione.

The above substance was mixed with 50 cc. of anhydrous acetone and 4 g. of recently fused potassium acetate and refluxed for 8 hours, concentrated to a small volume under reduced pressure and diluted with water, the solid was filtered and recrystallized from acetone hexane, yielding the 21-acetate of 6α-chloro-16α-trifluoromethyl-Δ⁴-pregnene-17α,21-diol-3,20-dione.

By the methods of alkaline hydrolysis described in Example VII, there was obtained the free compound. After incubation with adrenal glands, in accordance with the method of Example III, there was obtained 6α-chloro-16α-trifluoromethyl-hydrocortisone.

*Example XXXI*

A solution of 1 g. of 6α-chloro-16α-trifluoromethyl-hydrocortisone in 5 cc. of pyridine was treated for 4 hours with 4 cc. of acetice anhydride, thus giving the corresponding acetate.

The latter compound was oxidized with chromium trioxide in acetic acid in accordance with the method of Example IV, thus affording 6α-chloro-16α-trifluoromethyl-cortisone acetate. Upon treatment with 2,3-dichloro-5,6-dicyano-1,4-benzoquinone, by following the method of Example XXII, there was obtained 6α-chloro-16α-trifluoromethyl-prednisone acetate.

*Example XXXII*

By following the methods of Examples XXX and XXXI, but using as starting material 16α-monofluoromethyl-Δ⁵-pregnene-3β,17α-diol-20-one, described in our aforementioned copending application, there were obtained 16α - monofluoromethyl - 5α,6α - oxido - pregnan-3β,17α-diol-20-one, 16α-monofluoromethyl - 6β - chloro-pregnane-3β,5α,17α-triol - 20 - one, 6β-chloro-16α-monofluoromethyl-pregnane-5α,17α-diol-3,20-dione, 6α-chloro-16α-monofluoromethyl - Δ⁴ - pregnen-17α-ol-3,20-dione, 6α-chloro-16α-monofluoromethyl - Δ⁴ - pregnene-17α,21-diol-3,20-dione 21-acetate, 6α-chloro - 16α - monofluoromethyl-Δ⁴-pregnene-17α,21-diol - 3,20 - dione, 6α-chloro-16α - monofluoromethyl-hydrocortisone, 6α - chloro-16α-monofluoromethyl-hydrocortisone acetate, 6α-chloro-16α-monofluoromethyl-cortisone acetate and 6α-chloro-16α-monofluoromethyl-prednisone acetate.

We claim:
1. A compound of the following formula:

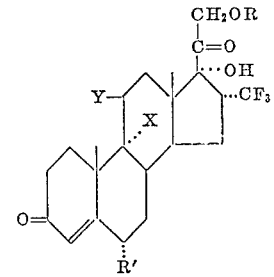

wherein R is selected from the group consisting of hydrogen and a hydrocarbon carboxylic acyl group of less than 12 carbon atoms; R' is selected from the group consisting of hydrogen, methyl, chlorine and fluorine; Y is selected from the group consisting of hydroxy and keto and X is selected from the group consisting of hydrogen, chlorine and fluorine.

2. 6α-methyl-16α-trifluoromethyl-cortisone.
3. 6α,9α-difluoro-16α-trifluoromethyl-hydrocortisone.
4. 16α-trifluoromethyl-hydrocortisone.
5. A compound of the following formula:

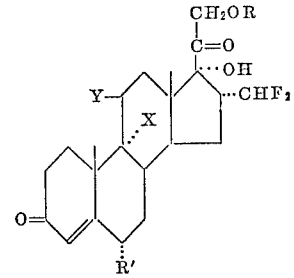

wherein R is selected from the group consisting of hydrogen and a hydrocarbon carboxylic acyl group of less than 12 carbon atoms; R' is selected from the group consisting of hydrogen, methyl, chlorine and fluorine; Y is selected from the group consisting of hydroxy and keto and X is selected from the group consisting of hydrogen, chlorine and fluorine.

6. 6α-chloro-16α-difluoromethyl-cortisone-21-acetate.
7. 6α-methyl-16α-difluoromethyl-hydrocortisone.
8. A compound of the following formula:

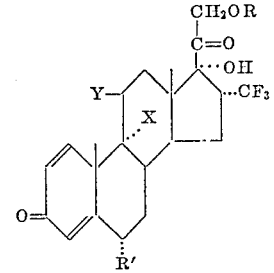

wherein R is selected from the group consisting of hydrogen and a hydrocarbon carboxylic acyl group of less than 12 carbon atoms; R' is selected from the group consisting of hydrogen, methyl, chlorine and fluorine; Y is selected from the group consisting of hydroxy and keto and X is selected from the group consisting of hydrogen, chlorine and fluorine.

9. 16α-trifluoromethyl-prednisolone-21-acetate.

10. 6α-methyl-16α-trifluoromethyl prednisone.
11. 6α-fluoro-16α-trifluoromethyl prednisolone.
12. A compound of the following formula:

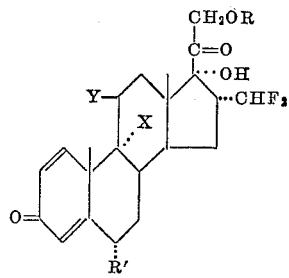

wherein R is selected from the group consisting of hydrogen and a hydrocarbon carboxylic acyl group of less than 12 carbon atoms; R' is selected from the group consisting of hydrogen, methyl, chlorine and fluorine; Y is selected from the group consisting of hydroxy and keto and X is selected from the group consisting of hydrogen, chlorine and fluorine.

13. 6α-chloro-9α-fluoro-16α-difluoromethyl-prednisone.
14. 6α-methyl-9α-fluoro - 16α - difluoromethyl-prednisolone.
15. 6α-fluoro-16α-difluoromethyl-prednisolone.

No references cited.